(12) United States Patent
Miyazawa et al.

(10) Patent No.: US 6,890,505 B2
(45) Date of Patent: May 10, 2005

(54) FINE CARBON WIRES AND METHODS FOR PRODUCING THE SAME

(75) Inventors: Kun-ichi Miyazawa, Tokyo (JP); Makoto Kuwabara, Tokyo (JP)

(73) Assignee: The University of Tokyo, Tokyo (JP)

( * ) Notice: Subject to any disclaimer, the term of this patent is extended or adjusted under 35 U.S.C. 154(b) by 174 days.

(21) Appl. No.: 10/125,333

(22) Filed: Apr. 17, 2002

(65) Prior Publication Data

US 2002/0192143 A1 Dec. 19, 2002

(51) Int. Cl.[7] .................................................. D01F 9/12
(52) U.S. Cl. .............................. 423/447.2; 423/447.1; 423/445 R; 423/445 B
(58) Field of Search .................... 423/447.1, 447.2, 423/445 R, 445 B

(56) References Cited

U.S. PATENT DOCUMENTS

| | | | |
|---|---|---|---|
| 5,039,504 A | 8/1991 | Kageyama et al. | 423/448 |
| 5,165,909 A | 11/1992 | Tennent et al. | 423/447.3 |
| 5,409,775 A | 4/1995 | Harada et al. | 428/367 |
| 5,413,866 A | 5/1995 | Baker et al. | 423/447.2 |
| 5,457,343 A * | 10/1995 | Ajayan et al. | 257/734 |
| 5,591,312 A | 1/1997 | Smalley | 204/157.41 |
| 6,325,909 B1 * | 12/2001 | Li et al. | 205/106 |
| 6,331,262 B1 * | 12/2001 | Haddon et al. | 252/502 |

OTHER PUBLICATIONS

Ge et al. "Scanning tunneling microscopy of single–shell nanotubes of carbon", Applied Physics Letters, vol. 65, No. 18, Oct. 31, 1994, pp. 2284–2286.*

Guo et al. "Self–Assembly of Tubular Fullerenes", Journal of Physical Chemistry, vol. 99, No. 27, 1995, pp. 10694–10697.*

* cited by examiner

Primary Examiner—Stuart L. Hendrickson
Assistant Examiner—Peter J Lish
(74) Attorney, Agent, or Firm—Knobbe Martens Olson & Bear, LLP

(57) ABSTRACT

A novel fine carbon wire includes a needle-like fullerene crystal having a smooth surface. The fine carbon wire can be produced by a method including the steps of (1) adding a solution containing the fullerene dissolved in a first solvent to a second solvent having less solvency for the fullerene than the first solvent; (2) forming a liquid-liquid interface between the solution and the second solvent; and (3) depositing a fine carbon wire at the liquid-liquid interface.

24 Claims, 30 Drawing Sheets

(a)

(b)

FINE CARBON WIRES AND METHODS FOR PRODUCING THE SAME

BACKGROUND OF THE INVENTION

1. Field of the Invention

The present invention relates to carbon materials including fullerenes as its components, especially fine carbon wires, and methods for producing the same.

2. Description of the Related Art $C_{60}$ is a typical fullerene. It is known that a needle-like substance containing $C_{60}$ can be obtained from a solution of $C_{60}$ in toluene (See S. Ogawa, H. Furusawa, T. Watanabe, and H. Yamamoto, "Observation of condensed structure of $C_{60}$ assembled from solution" Journal of Physics and Chemistry of Solids, 61(2000) 1045–1050).

However, the reference only shows a technique in which $C_{60}$ is deposited from a solution of $C_{60}$ in toluene and thereby yields such a needle-like substance. According to this technique, the needle-like substance very slowly grows to about 20 mm in length over six months. The growth rate of the needle-like substance of $C_{60}$ according to the technique is excessively low and it takes a much long time for the needle-like substance to grow.

According to such conventional techniques, a practically sufficient growth rate cannot be obtained in the production of one-dimensional substances including fullerenes as its components, especially wire-like carbon materials.

The conventional needle-like substance of $C_{60}$ is obtained by depositing from a solution of $C_{60}$ containing toluene alone as a solvent. The resulting needle-like substance is amorphous (see the aforementioned reference).

Japanese Unexamined Patent Application Publication No. 10-1306 discloses a cluster obtained by adding a poor solvent for fullerenes to a solution of a fullerene monomer.

Such a cluster, however, is made of the fullerene monomer associated by the van der Waals force and is not a crystal but a granule.

It is also known that the needle-like substance of $C_{60}$ can also be obtained by evaporating a solution of $C_{60}$ in a mixture of 95 wt % of hexane and 5 wt % of benzene or a solution having a similar composition at temperatures ranging from room temperature to 80° C. (Y. Yosida, Jpn. J. Appl. Phys. 1992; 31: L505, "Scanning electron microscope images of $C_{60}$ whiskers").

The needle-like crystal of the above-mentioned substance has a very rough surface and is apparently different from a needle-like fullerene crystal having a smooth surface. In addition, the scanning electron microscope images of the needle-like crystal in the reference show that this crystal is a polycrystal.

Electric drive mechanisms of microminiature devices such as micro-sensor assemblies and micromachines require fine conductive wires for supplying electricity. However, fine metal wires include grain boundaries formed by crystallization and inevitably cause increased electric resistance due to segregation of dopants into the grain boundaries, and rupture and increased surface roughness at the grain boundaries.

The tip shapes of such fine metal wires depend n the crystal habit of the metal crystals, and the fine metal wires can hardly have a nearly spherical tip having a curvature on the order of nanometers.

In addition, the metallic fine wires cannot significantly have a chemically modified structure by combining a specific functional group to the surface so as to constitute a higher order structure.

SUMMARY OF THE INVENTION

Accordingly, an object of the present invention is to provide a novel fine carbon wire including a fullerene as its component. Another object of the present invention is to produce a fine carbon wire including a fullerene as its component from a solution of the fullerene at high speed.

Specifically, the present invention provides, in a first aspect, a fine carbon wire including a fullerene in the form of a needle-like crystal having a smooth surface.

The present invention provides, in a second aspect, a fine carbon wire including a fullerene in the form of a branched needle-like crystal.

In a third aspect, the present invention provides a method for producing a fine carbon wire including a fullerene. This method includes the steps of (1) putting together a solution containing the fullerene dissolved in a first solvent with a second solvent having less solvency for the fullerene than the first solvent; (2) forming a liquid-liquid interface between the solution and the second solvent; and (3) depositing a fine carbon wire at the liquid-liquid interface.

In a fourth aspect, the present invention provides a method for producing a fine carbon wire including a fullerene. This method includes the steps of (1) putting together a solution containing the fullerene dissolved in a first solvent with a second solvent having less solvency for the fullerene than the first solvent; and (2) subjecting the solution and the second solvent to ultrasonic treatment to thereby deposit a fine carbon wire.

The present invention is based on the finding that, when a solvent is added to a solution of a fullerene dissolved in another solvent different from the former solvent, the resulting solution deposits a single wire-like crystal of the fullerene (a fullerene wire) having crystal habit.

After further investigations based on the above finding, the present inventors have found that a carbon material is obtained by putting together a solution containing a fullerene dissolved in a first solvent with a second solvent having less solvency for the fullerene than the first solvent, forming a liquid-liquid interface between the solution and the second solvent and depositing the carbon material from the solution, and that the resulting carbon material is a needle-like fullerene crystal having a smooth surface that has not been obtained in conventional equivalents. The present invention has been accomplished based on these findings.

The term "wire" as used herein means "fine wire" and the term "a fine carbon wire" means "a wire including carbon as its component". Such fine carbon wires include needle-like crystals (inclusive of needle-like single crystals and needle-like polycrystals) each including a fullerene.

Fine carbon wires each including a fullerene in the form of a needle-like crystal are referred to as "fullerene wires" or "fullerene whiskers". The term "fullerene wires" means and includes fine carbon wires mainly including wire-like single fullerene crystal having crystal habit. The term "fullerene whiskers" means and includes fine carbon wires including a wire-like single fullerene crystal, and needle-like single crystals and needle-like polycrystals of a fullerene.

The present invention in the first aspect relates to a fine carbon wire including a needle-like fullerene crystal having a smooth surface.

Fullerenes for use in the present invention include $C_{60}$, $C_{70}$ and other higher fullerenes. Needle-like crystals of such fullerenes include needle-like single crystals and needle-like polycrystals.

The smooth surface of the needle-like fullerene crystal according to the present invention is a kind of crystal habits of the needle-like fullerene crystal itself. In general, the term "crystal habit" means dimensional characteristics, i.e., the size and shape, of the crystal.

The needle-like fullerene crystal according to the present invention has a needle-like crystal form that varies depending on the degree of growth of crystallographically equivalent faces.

The term "needle" as used herein means a shape having an external diameter of 1 nm or more, a length of 1 μm or more and an aspect ratio (the ratio of the length to the external diameter) of 2 or more.

The needle-like fullerene crystal having a crystal habit of smooth surface has been first found by the present inventors.

The fine carbon wire including a fullerene according to the first aspect of the present invention is a needle-like fullerene crystal having a smooth surface, and can therefore avoid the problems in surface roughness of conventional fine metal wires and the like. Additionally, the fine carbon wire has a low friction coefficient and can therefore be applied to, for example, sliding parts of micromachines.

The present invention in the second aspect relates to a fine carbon wire including a branched needle-like fullerene crystal.

The branched needle-like fullerene crystal has been first found by the present inventors.

The fine carbon wire including a fullerene according to the second aspect of the present invention is a branched needle-like fullerene crystal and can therefore be applied to, for example, conductive circuits.

The present invention in the third aspect relates to a method of producing a fine carbon wire including a fullerene, and specifically to a method of producing a needle-like fullerene crystal having a smooth surface (this method may be hereinafter briefly referred to as "Method 1").

In this method, a first solvent dissolves a material fullerene and thereby yields a solution. The first solvent includes a solvent system that can dissolve the fullerene.

In the above method, a second solvent is added to the solution of the fullerene. The second solvent includes a solvent system that is of a type different from the first solvent and has less solvency for the fullerene than the first solvent.

The second solvent serves to deposit a fine carbon wire including the fullerene from the fullerene solution.

According to Method 1, a fine carbon wire including a fullerene is produced by putting together the solution of the fullerene with the second solvent, forming a liquid-liquid interface between the fullerene solution and the second solvent and depositing a fine carbon wire from the fullerene solution.

The aforementioned fine carbon wire includes substances derived from the first and second solvents combined with the fullerene by at least one bond selected from the group consisting of an intermolecular bond due to intermolecular force, an ionic bond and a covalent bond.

Method 1 can easily yield a fine carbon wire including a fullerene at a high growth rate of about 10 to 400 μm/h by deposition at a liquid-liquid interface using a given first solvent and a second solvent different therefrom.

According to Method 1, the substances derived from the first and second solvents are combined with the fullerene by a given chemical bond and an intermolecular bond and, in addition, the molecules of the fullerene are combined with each other by an intermolecular bond. The resulting carbon materials, specifically fine carbon wires, have significantly higher strength than those including a pure fullerene alone.

The present invention in the fourth aspect relates to a method of producing a fine carbon wire including a fullerene, and specifically to a method of producing a branched needle-like fullerene crystal (this method may be hereinafter briefly referred to as "Method 2").

Method 2 is similar to Method 1, except that the second step is different. In the second step of Method 2, the solution and the second solvent are subjected to ultrasonic treatment to thereby deposit a fine carbon wire.

Method 2 can easily yield a fine carbon wire including a fullerene, especially a branched needle-like crystal of the fullerene at a high growth rate as in Method 1.

The fine carbon wires of the present invention include fullerenes as needle-like fullerene crystals each having a smooth surface and are novel fine carbon wires. Accordingly, they can solve problems in surface roughness of conventional fine metal wires and can be applied to sliding parts of micromachines because of their low friction coefficients.

The methods of producing a fullerene according to the present invention can easily yield such fine carbon wires including fullerenes from a fullerene solution at a high growth rate of from 10 to 400 μm/h.

BRIEF DESCRIPTION OF THE DRAWINGS

For a better understanding of the invention as well as other objects and features thereof, reference is made to the following detailed description to be read in conjunction with the accompanying drawings, wherein.

DESCRIPTION OF THE PREFERRED EMBODIMENTS

Figure 1:
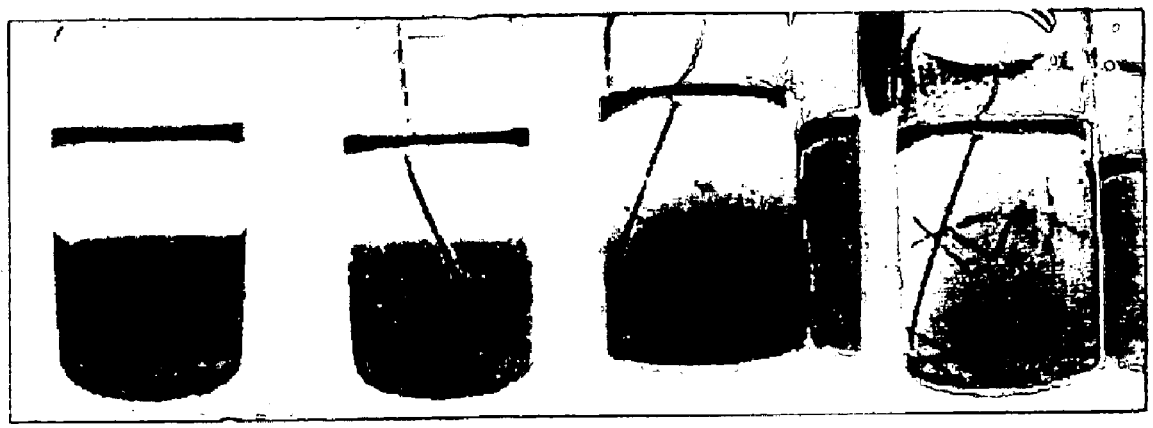
FIG. 1 is a photograph showing the production steps of a fullerene wire.

Carbon materials including fullerenes as components in the present invention include fine carbon wires [including fullerene wires and fullerene whiskers (hereinafter briefly referred to as "FWs")], and materials prepared from such fine carbon wires by at least one means such as cutting or pulverization to a predetermined average length or average grain size.

(1) First Aspect

The present invention in the first aspect includes carbon materials having crystal habit, having a wire-like shape and including a single crystal of the fullerene.

(1-1) Fullerene Wires

Wire-like single fullerene crystals according to the present invention have crystal habit. The term "crystal habit" as used herein means the characteristics or features of the size and shape of the crystal in question.

The single fullerene crystal according to the present invention has a wire-like crystal form which varies depending on the degree of growth of crystallographically equivalent faces.

The term "needle" as used herein means and includes a shape having an external diameter of 3 nm or more, a length of 50 $\mu$m or more and an aspect ratio (the ratio of the length to the outer diameter) of 2 or more.

Such a wire-like single fullerene crystal having crystal habit is novel and has been first found by the present inventors.

The carbon material including a fullerene according to the present invention is a wire-like single fullerene crystal having crystal habit, has a higher strength than a powdered crystal of a fullerene alone, has anisotropy and can serve as an excellent insulator or conductor. In addition, the carbon material can exhibit excellent low-dimensional conductivity by applying a high voltage or by adding an electrically conductive substance thereto.

According to the present invention, such wire-like crystals can have an external diameter of from 3 nm to 1000 $\mu$m, a length of from 50 $\mu$m to 20 mm and an aspect ratio of from 2 to several hundreds. The needle-like crystals of the present invention can have an external diameter of from 1 nm to 1000 $\mu$m, a length of from 1 $\mu$m to 20 mm and an aspect ratio of from 2 to several thousands or more.

The minimum value of the aspect ratio of the crystal for use in the present invention can be set at 2, which is larger than the crystallographically acceptable minimum aspect ratio of 1.63 when the [0001] axis in a hexagonal crystal is defined as the growth axis. The maximum value of the aspect ratio is not specifically limited and can be set at 100, 200, 300, or several hundreds or more. These ranges are supposed to be preferred as a result of observation in wires having a length of 2 cm and a diameter of 0.2 mm.

Such thin and slender crystals are supposed to form by action of anisotropy in preferred orientation or in growth rate.

After investigations, the present inventors have found that these wire-like crystals each have fullerene face-centered cubic crystals as a basic unit cell and include strain or distortion portions of face-centered cubic crystals formed by insertion of a substance other than the fullerene into pores between fullerene molecules.

The strain portions of the face-centered cubic crystal constitute a rhombohedral or another crystal that has anisotropy in preferred orientation, and crystals of the fullerene grow on, for example, side faces of the rhombohedral crystal.

The wire-like fullerene crystals according to the present invention can have crystal habit. The crystal habit appears as various wire-like crystal forms depending on the degree of growth of crystallographically equivalent faces, in contrast to crystals (face-centered cubic crystals) of pure fullerenes.

This crystal habit can clearly be determined as a hexagon, for example, by the observation of cross sections of wire-like crystals.

When a powdered crystal of a fullerene is molded at high temperatures and high pressures within specific ranges, the fullerene may be polymerized to yield a rhombohedral crystal which can become a powder having a crystal habit plane. At temperatures and pressures equal to or more than the specific ranges, the powered fullerene crystal is supposed to form a glassy carbon or diamond having a crystal habit plane.

However, the investigations made by the present inventors show that this type of crystal habit has not been observed in a linear carbon material obtained from a fullerene by charging $C_{60}$ into a silver tube and wire-drawing to thereby yield a wire.

The fine carbon wire according to the first aspect includes a wire-like single fullerene crystal having the crystal habit. The single crystal can have a wire-like shape owing to, for example, anisotropy in a molecular bond.

The wire-like single crystal can yield a carbon material that is excellent in strength and exhibits superior insulative or conductive anisotropy as compared with powdered carbon materials, amorphous carbon materials or bulk carbon materials.

The carbon materials of the present invention can be applied to a wide variety of fields such as appliance industry, automobile industry, mechanical industry and aerospace industry.

The carbon materials of the present invention can have high strength and can satisfactorily be used in the fields of lubricating materials, ferroelectric fillers, dispersion reinforcing materials and semiconductors.

They can be applied to products such as ferroelectric ceramics and polymers, piezoelectric elements, self-lubricating ceramics and polymers, insulating materials and semiconductor materials.

The carbon materials of the present invention can yield polymerized fullerene wires that are polymerized by high pressure hot-pressing or polymerized fullerene wire-ceramics complexes that are prepared by hot-pressing the carbon materials with ceramics at high pressures.

(1-2) Fullerene Whiskers

The term "fullerene whisker(s)" or "FW(s)" herein is used as a generic name of needle-like fullerene crystals including the aforementioned fullerene wires.

The fullerene whiskers according to the present invention can have a nearly spherical tip having a curvature on the order of nanometers.

The fullerene whiskers according to the present invention are frequently obtained as polycrystals each having a large external diameter. Such poly-crystalline fullerene whiskers may have a structure consisting of a bundle of several single-crystalline fullerene whiskers.

(1-3) Fullerene Nanowhiskers

Among the fullerene whiskers of the present invention, single-crystalline fine carbon wires each having a submicron or less external diameter are referred to as fullerene nanowhiskers (FNWs). The length of such fullerene nanowhiskers ranges from several folds of its external diameter to several tens of millimeters. The term "fullerene nanowhiskers" has been first used by the present inventors.

The fullerene nanowhiskers according to the present invention are needle-like crystals of fullerenes (e.g., $C_{60}$ and $C_{70}$) each having a submicron external diameter. All of the fullerene nanowhiskers according to the conventional studies consist of single crystals alone and have a growth axis in a closest packing direction of fullerene molecules.

In this connection, carbon fibers are obtained by heating organic polymeric fibers at high temperatures of 800° C. to 3000° C. or by spinning pitch and heating the spun pitch, and do not include fullerenes as a constitutional unit.

The fullerene whiskers and fullerene nanowhiskers according to the present invention are needle-like fullerene crystals and have a three-dimensional periodic structure whose symmetry is defined by the space group. In contrast, the polymers or clusters of fullerene (see Japanese Unexamined Patent Application Publication No. 10-1306) are not crystalline and can clearly crystallographically be distinguished from the fullerene whiskers and fullerene nanowhiskers.

Carbon nanotubes each have a structure of a cylindrically rounded graphite sheet and can apparently be distinguished from the fullerene whiskers and fullerene nanowhiskers consisting of fullerene molecules.

The fullerenes has low friction coefficient and the fullerene nanowhiskers have no grain boundary. Accordingly, the fullerene nanowhiskers can have very small surface roughness at an atomic level.

The fullerene nanowhiskers have a smooth surface having a low friction coefficient and can be used as light-weight conductive fine wires, thus solving the problems in weight and surface roughness of conventional fine metal wires. In addition, the fullerene nanowhiskers may possibly become superconductors by adding alkali metal elements thereto.

Since the fullerene nanowhiskers have a surface covered with fullerene molecules such as $C_{60}$, the surface of the fullerene nanowhiskers can be modified with organic molecules that yield covalent bonds. This modification cannot be achieved in conventional fine metal wires.

The fullerene nanowhiskers according to the present invention can be applied to a wide variety of fields such as electronic industry, mechanical industry and aerospace industry. It can also be applied to chemical industry, since the fullerene nanowhiskers can form chemical bonds with organic materials and can be used as reagents.

These fullerene nanowhiskers are semiconductors and can be used as low-dimensional semiconductors or quantum wires in the semiconductor industry. By regularly arraying, the fullerene nanowhiskers can yield novel photonic crystals and can therefore be used in the optoelectronic device industry.

Since the fullerenes satisfactorily store hydrogen and the fullerene nanowhiskers can be used as materials for a hydrogen-storing unit, the fullerene nanowhiskers can be used in the energy industry.

The $C_{60}$ molecule is known to be an excellent field emission material. Therefore the fullerene nanowhiskers of $C_{60}$ ($C_{60}$ NW) can be used as field-emitter devices such as plasma displays.

Since a tip of the fullerene nanowhiskers consisting of $C_{60}$ has a spherical structure having a curvature radius on the order of nanometers, the tip has a very smooth shape. The fullerene nanowhiskers can therefore be used as probes in tracer surface profiling instruments. In addition, since the $C_{60}$ NWs are conductive, they can be used as probes in scanning tunneling microscopes.

The $C_{60}$ nanowhiskers can also be used as superconductive fine wires, since the constitutive $C_{60}$ crystals can become superconductors by doping of alkali metals.

The use of these fullerene nanowhiskers as conductors in high-density printed wiring boards or integrated circuits can reduce the weight of the resulting equipment.

The fullerene nanowhiskers can chemically be modified, can therefore be compounded with organic molecules and can be used as reinforcing materials in, for example, photoresists.

In addition, the fullerene nanowhiskers are excellent in conductivity and linearity, exhibit low friction and can therefore be used as sliding members of micromachines.

The $C_{60}$ nanowhiskers have introduced lattice dislocation, can plastically be deformed and can be deformed into optional shapes such as coils.

The $C_{60}$ nanowhiskers are insulative when they have a large diameter. However, they have a decreasing resistivity with a decreasing diameter and therefore can be used as novel semiconductor materials.

(1-4) $C_{70}$ Fullerene Whiskers

The fine carbon wires according to the first aspect of the present invention are preferably those including $C_{70}$ in the form of needle-like crystals.

Such needle-like $C_{70}$ crystals have high crystallinity and a low lattice defect density. In addition, they become a good conductor and, among them, needle-like single crystals are very satisfactory as fine carbon wires or field emission devices in transistors. The $C_{70}$ whiskers have a multilayered lamina structure and therefore flexibly deform. They are expected to be high-temperature superconductors. They have a smooth surface, have a very low friction coefficient and are useful as sliding members in micromachines. The $C_{70}$ whiskers are also expected to be doped with dopant elements in high concentration or to exhibit high catalytic activities since they have a high porosity.

(1-5) Cavity (Hollow Portions)

The needle-like fullerene crystals according to the present invention may have a cavity (hollow portion). The shape and the location of the cavity are not particularly limited. The needle-like fullerene crystals may each have the cavity at the core or at the tip, or both. Not only the needle-like polycrystals but also needle-like single crystals may have such a cavity. Unlike carbon nanotubes which have cylindrical structures made of graphite sheet, the needle-like fullerene crystals is a macromolecule in which fullerene molecules are linearly polymerized.

The cavity may be formed at the core of a bundle of needle-like fullerene crystals or may be formed at the core of a single fullerene crystal whisker. The investigations made by the present inventors show that the cavity may be formed by concentric shells of needle-like fullerene crystals, i.e., the cavity may have a "core-shell" structure. In the concentric shells, the cavity is formed by needle-like fullerene crystals concentrically surrounding therearound.

Such a hollow needle-like crystal having a cavity has a low spatial packing fraction and has a large surface area. The resulting fine carbon wire made of the hollow needle-like crystal is useful as a catalyst or a waveguide.

The hollow needle-like crystal has a higher specific strength and is useful as a fine carbon wire having flexibility. It can easily yield an electrode by introducing a liquid metal into the cavity and can therefore be used as a diode. In addition, it can yield high catalytic activity by introducing, for example, a catalytic element into the cavity.

(1-6) Multilayered Lamina

The needle-like fullerene crystal according to the present invention may have a multilayered lamina of the fullerene.

Such fullerene laminae are not specifically limited in thickness and other dimensions. For example, the multilayered lamina may have 1 to 100 piles of stacked slabs of the needle-like fullerene crystal each having a thickness of 1 to 50 nm or may have 1 to 100 pairs of one relatively thin lamina and one relatively thick lamina.

The resulting fine carbon wire comprising the multilayered lamina may be branched by partially delaminating the multilayered structure using physical or chemical means. Alternatively, a branched fine carbon wire can be produced by binding fine carbon wires with each other by means of physical or chemical procedures.

(1-7) Dopants

The needle-like fullerene crystal according to the present invention may further include dopants. Iodine, bromine and other halogen atoms, alkali metals, and methyl bromide may be recited by way of example.

The resulting doped needle-like fullerene crystal can have significantly improved physical properties. For example, doping of iodine yields a low-temperature ferromagnetic and doping of an alkali metal yields a superconductor, respectively, of the needle-like fullerene crystal.

The needle-like fullerene crystal can be doped with such dopants according to various techniques. For example, the fullerene crystal is doped with a dopant during its growth by adding the dopant into a solution in which the crystal is growing according to the method of the present invention.

Alternatively, the fullerene crystal can easily be doped with the dopant by preparing the crystal and subsequently exposing the resulting crystal to an atmosphere containing the dopant, such as a gas or solution.

(2) Second Aspect

The present invention in the second aspect relates to a fine carbon wire having a branched needle-like fullerene crystal.

The term "branched" as used herein means that the crystal has at least one branch. For example, it means that the needle-like fullerene crystal has a stem and a branch.

Such branched needle-like crystals include a needle-like crystal having a stem with some orientation from which two branches are branched off in two directions different from the orientation, and a needle-like crystal having a stem and one branch branched off the stem.

The fine carbon wire according to the second aspect consists of a branched needle-like fullerene crystal and can be designed into a circuit in accordance with the branch.

(3) Third Aspect (Method 1)

The method of the present invention according to the third aspect (Method 1) can yield crystalline fine carbon wires each having a thickness on the order of micrometers to nanometers from fullerenes.

According to Method 1 for the production of a fine carbon wire including a fullerene, a second solvent is added to a solution containing the fullerene dissolved in a first solvent to thereby deposit a carbon material from the solution.

Method 1 can yield a fine carbon wire including a fullerene in which the fine carbon wire is a fullerene single crystal and the fullerene single crystal is a needle-like fullerene crystal having a smooth surface and including a wire-like carbon material having crystal habit.

According to this method, the second solvent may be added to the solution of the fullerene dissolved in the first solvent to thereby deposit a carbon material comprising the fullerene from the fullerene solution.

Alternatively, the solution of the fullerene dissolved in the first solvent may be added to the second solvent to thereby deposit a carbon material comprising the fullerene from the fullerene solution.

(3-1) Materials

Fullerenes for use as the materials in the present invention include, for example, $C_{60}$, $C_{70}$, $C_{80}$ and other fullerenes.

(3-2) First Solvents

First solvents for use herein have only to consist of a solvent system that can dissolve fullerenes. The solvent system may be made of one solvent alone or two or more types of solvents in combination.

Such first solvents may be good-solvent systems including, for example, good solvents for fullerenes. The good-solvent systems are solvent systems that can highly dissolve fullerenes.

Such good solvents for use in the present invention may include nonpolar solvents such as hydrocarbon solvents.

Preferred first solvents are hydrocarbon solvents including at least one hydrocarbon selected from the group consisting of toluene, xylene, benzene, hexane, heptane, and derivatives thereof (e.g., benzonitrile).

More preferably, the first solvent is a solvent consisting of at least one hydrocarbon selected from the group consisting of toluene, benzene and hexane. Such a solvent can highly dissolve fullerenes.

(3-3) Fullerene Solutions

Fullerene solutions for use in the present invention may be solutions each containing a fullerene dissolved therein. Such solutions may be either of saturated solutions and unsaturated solutions.

Preferred fullerene solutions are saturated fullerene solutions, since they can highly deposit the fullerene.

(3-4) Additives

The fullerene solution may further include additives that serve to improve the solvency for the fullerene, in addition to the first solvent. Additives that do not suppress the deposition of the target carbon material are preferred.

(3-5) Second Solvents

Second solvents for use herein may consist of solvent systems of different type from that of the first solvent dissolving the fullerene. Such solvent systems may include one solvent alone or two or more types of solvents in combination.

As the second solvent, poor-solvent systems consisting of poor solvents for fullerenes and other ingredients can be used. These poor-solvent systems are solvent systems having low solvency for fullerenes.

Such poor solvents may include, for example, polar solvents such as alcohol solvents.

Preferred second solvents are alcohol solvents including at least one alcohol selected from the group consisting of pentanol, butyl alcohol, isopropyl alcohol, n-propyl alcohol, methanol (methyl alcohol), ethanol (ethyl alcohol) and polyhydric alcohols such as ethylene glycol.

(3-6) Auxiliaries

The second solvent may further include, in addition to the second solvent, auxiliaries that accelerate the deposition of the target carbon material.

(3-7) Nucleation

According to the method of the present invention, a nucleus of a carbon material including a fullerene may be formed from the fullerene solution at the early stages of addition of the second solvent or during deposition of the carbon material. The nucleus may consist of the fullerene alone, the carbon material itself including the fullerene, substances derived from the first solvent and/or the second solvent, or other substances.

Such a nucleus may be added to the fullerene solution separately from the addition of the second solvent.

The nucleus grows by an appropriate procedure such as standing still of the solution mixed with the second solvent and thereby yields the carbon material including the fullerene.

(3-8) Nucleation Metals

Metals can be used to accelerate the nucleation. At least one metal selected from the group consisting of copper, aluminum, gold and stainless steel may be used as such a metal. The metal can be in the form of a wire, plate or mesh.

(3-9) Liquid-Liquid Interface

According to Method 1, the carbon material including the fullerene can be deposited from the fullerene solution by action of a liquid-liquid interface formed between the fullerene solution and the second solvent.

The liquid-liquid interface can be formed by using the first and second solvents including different types of solvent systems that are immiscible with each other.

To form the liquid-liquid interface, the first and second solvents may not always permanently be separated from each other and may be mixed during standing still.

For example, the use of toluene as the first solvent and isopropyl alcohol as the second solvent is typically preferred.

The liquid-liquid interface can be formed, for example, by gently adding the second solvent to the fullerene solution. This procedure is typically effective when the first and second solvents are solvent systems at least partly miscible with each other.

The liquid-liquid interface can be formed and maintained in at least one stage of the early stage of addition of the second solvent, during nucleation, during deposition and during growth, respectively, of the carbon material.

The first solvent dissolving the fullerene and the second solvent may preferably have different densities from each other. This configuration can more easily yield the liquid-liquid interface between the fullerene solution and the second solvent.

(3-10) Combinations of First and Second Solvents

Preferably, the first solvent including at least one substance selected from the group consisting of toluene, xylene, benzene, hexane, pentane and benzonitrile, and the second solvent used in combination comprises at least one alcohol selected from isopropyl alcohol, n-propyl alcohol, methanol, ethanol and ethylene glycol. For example, toluene (density: about 0.87 $gcm^{-3}$) as the first solvent is used in combination with isopropyl alcohol (density: about 0.79 $gcm^{-3}$) as the second solvent.

(3-11) Deposition Conditions

When deposition of the carbon material including the fullerene is performed, various conditions such as the type, purity and amount of the starting material fullerene, the types of the first and second solvents, the amount of first solvent, the type of the additives, the amount and adding procedure of the second solvent, the type of the auxiliaries, nucleation, addition of the nucleus, growth of the nucleus, formation and maintenance of the liquid-liquid interface, and temperatures can appropriately be set.

The fine carbon wire including the fullerene can be deposited at room temperature (around 21° C.). The deposition temperature is preferably from −20° C. to 75° C. and more preferably from 10° C. to 30° C.

By taking $C_{60}$ as an example of the fullerene, 3 mL of isopropyl alcohol as the second solvent is preferably added to 3 mL of a saturated solution of the fullerene in toluene. Under this condition, the carbon material can grow at a rate on the order of 200 µm/h.

By appropriately setting the deposition conditions (parameters), the carbon material can grow at high speed, i.e., at a rate of 10 µm/h or more, according to the present invention. The growth rate can be set at preferably from 10 to 400 µm/h and more preferably from 200 to 400 µm/h.

(3-12) Deposition Containers

The carbon material of the present invention can be deposited in a variety of containers. Such containers are preferably transparent to see how the carbon material deposits. To avoid photochemical reactions of the fullerene, the container is preferably light-shielded, for example, by covering with aluminum foil except when the deposition is checked.

The container is not specifically limited in its size. Grooves formed on silicon substrates by lithography technique and having a size on the order of micrometers to nanometers can be used as the container. In general, bottles having a diameter of about 20 mm are preferably used, as they are easy to handle. To produce the carbon material in large quantity, beakers having a capacity of, for example, 100 mL can be used.

Lidded bottles such as vials can be used as the container to avoid evaporation of the solvents. The container is preferably made of glass for its inertness with various solvents, high stability and high durability.

(3-13) Deposited Carbon Materials

According to Method 1, substances derived from the first and second solvents are combined with the fullerene through at least one bond selected from the group consisting of intermolecular bond, ionic bond and covalent bond and thereby yield the carbon material including the fullerene.

A carbon material in which the fullerene molecules are combined with each other by intermolecular force is as hard as gold. A carbon material prepared by deposition of a fullerene from toluene alone as a solvent has an improved strength due to the intermolecular bond between toluene and the fullerene.

The carbon material of the present invention has a further improved strength, since the substances derived from two or more types of the solvents are combined with the fullerene through intermolecular bond or chemical bond in the carbon material. The improvement in strength is due to the intermolecular bond or chemical bond between the substances derived from the solvents and the fullerene, in addition to the intermolecular bond between the fullerene molecules with each other and the intermolecular bond between toluene and the fullerene.

By using substances that can form ionic bonds or substances having an alcoholic hydroxyl group as the first and/or second solvent, a carbon material including the fullerene that is combined with these substances or the substances derived from the solvents through an ionic bond or a covalent bond can be obtained.

The produced carbon material can be separated from the solution by an appropriate means such as filtration or centrifugal separation.

The carbon material can be pulverized to an appropriate size by an appropriate means such as a mill and thereby yields a carbon material having a uniform grain size, length and other dimensions.

The method of the present invention (Method 1) can yield the carbon material including the fullerene as a wire-like crystal (fullerene wire) having crystal habit. The wire-like crystal can be formed by allowing the fullerene to grow in the form of a wire in a predetermined direction. The crystal may be either a single crystal or polycrystal.

(4) Fourth Aspect (Method 2)

The present invention according to the fourth aspect relates to a method for producing a fine carbon wire including a fullerene by the use of ultrasonic treatment (Method 2).

Various conditions for the ultrasonic treatment such as intensity and time period may be employed. Preferably, the ultrasonic treatment is performed at room temperature for 1 to 30 minutes.

The investigations made by the present inventors suggest that ultrasonic treatment significantly increases the surface area of the interface between the droplets consisting of the first or second solvent and the second or first solvent to thereby accelerate crystal growth by action of the liquid-liquid interface. In addition, the ultrasonic treatment induces a local high pressure which may contribute to the nucleation and the growth of the crystal.

(4-1) Metallic Catalysts or Metal Oxide Catalysts

Metallic catalysts or metal oxide catalysts can be used in Method 2 to accelerate the crystal growth. Such catalysts can also be used in Method 1.

The metallic catalysts include, for example, copper, aluminum, iron, gold, other metals and combinations thereof.

The metal oxide catalysts include, but are not limited to, lead zirconate titanate, zirconium oxide, titanium oxide, lead oxide and combinations thereof.

(5) Advantages

The present invention can concurrently yield both needle-like crystals and single-crystal fibers (whiskers) of fullerenes at a liquid-liquid interface formed by a poor solvent for the fullerenes and a saturated solution of the fullerene dissolved in a good solvent.

The $C_{60}$ fullerene whiskers are highly resistant semiconductors or insulators when they have an external diameter of 10 µm or more, but have a significantly reduced their resistivity and become conductive when they have an external diameter on the order of micrometers or less. Such conductivity can be explained by increased overlapping of the electron wave function due to a decreased distance between $C_{60}$ molecules. The $C_{60}$ fullerene whiskers may probably become superconductive fine wires by doping, for example, alkali metal elements.

The $C_{60}$ nanowhiskers and $C_{60}$ whiskers can undergo plastic working, can take various shapes and can therefore undergo heat treatment and processing according to similar procedures to those in metals. For example, they can be processed into coils and can be used as, for example, micro-antennas. The $C_{60}$ whiskers have smooth surfaces all around, have a low friction coefficient and can therefore be applied to, for example, sliding parts of micromachines. The $C_{60}$ nanowhiskers each have a spherical tip and can be applied to probes of tracer sensors.

The $C_{60}$ whiskers can chemically be modified on their surfaces and can therefore be used as organic synthesis reagents. They can also yield a variety of novel functional substances as a result of combining or bonding with glass, polymers, ceramics or metals and can be used as excellent hydrogen-storing materials. They can yield materials that are optically, electrically or mechanically anisotropic by pressing them at high temperatures and high pressures to thereby three-dimensionally polymerize $C_{60}$ molecules.

By geometrically arraying the $C_{60}$ whiskers with the use of templates formed by lithography, they can yield, for example, novel photonic crystals, catalysts and field emission devices. The present invention can also be applied to $C_{70}$ and other higher fullerenes. By using these fullerene whiskers as internal or external templates, substances can be synthesized or shaped. For example, coating of the fullerene whiskers with a ceramic colloidal solution and chemically or thermally treating the coated whiskers can yield composites of the fullerene whiskers and ceramics. In addition, chemical or thermal removal of the fullerene whiskers from the composites can yield porous ceramics or ceramic tubes. Compounding of the fullerene whiskers with metals, glass or polymers instead of ceramics can yield composites of the fullerene whiskers and porous metals, glass or polymers. Removal of the fullerene whiskers from these composites can yield metal tubes, polymer tubes or glass tubes using the fullerene whiskers as templates. The removed fullerene molecules can be reused.

As thus described above, the fullerene whiskers can significantly freely be applied.

EXAMPLES

The present invention will be illustrated in further detail with reference to several examples and attached drawings, which are not intended to limit the scope of the invention.

Example 1

Isopropyl alcohol was gently added to a saturated $C_{60}$ solution in toluene in a transparent container such as a glass vial (external diameter 20 mm), the vial was lidded and was allowed to stand still for about several hours to about nine hours.

Nuclei of needle-like crystals including $C_{60}$ were formed and grew at the interface between toluene and isopropyl alcohol and thereby yielded fullerene wires.

Figure 2:
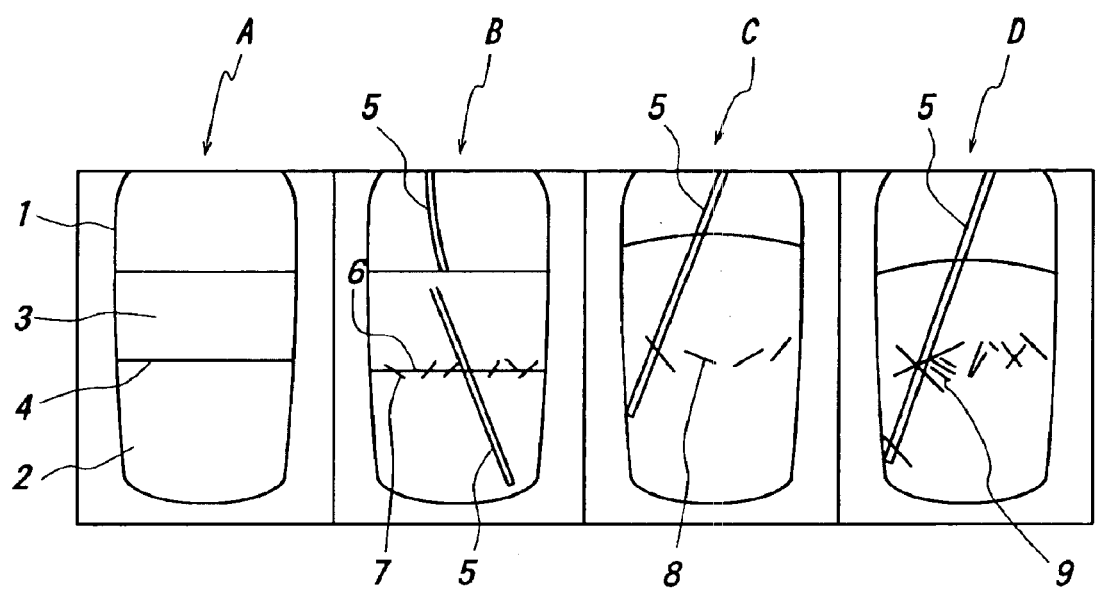
FIGS. 2A to 2D are each an explanatory diagram corresponding to FIG. 1.

FIG. 1 is a photograph showing how the fullerene wires were produced in the present example. FIGS. 2A to 2D are each an explanatory diagram of FIG. 1. FIG. 2A shows a vial 1 immediately after the addition of isopropyl alcohol (time zero).

As shown in FIG. 2A, a lower layer 2 is the solution of $C_{60}$ in toluene (density: about 0.87 $gcm^{-3}$) and an upper layer 3 is isopropyl alcohol (density: about 0.79 $gcm^{-3}$) in the vial 1. An interface 4 was formed between the lower layer 2 and the upper layer 3.

A line extending from the top to the bottom of each of FIGS. 2B, 2C and 2D is a copper wire 5 as a mark. FIG. 2B shows a state inside the vial 1 nine hours after the addition of isopropyl alcohol. As shown in FIG. 2B, fullerene wires 7 were formed at a boundary 6 which was the interface 4 between toluene and isopropyl alcohol in FIG. 2A. The formation of the fullerene wires 7 is not clearly observed in FIG. 1.

FIGS. 2C and 2D show how the fullerene wire grew 24 hours and 53 hours after the addition of isopropyl alcohol, respectively. Grown fullerene wires 8 were observed 24 hours later, and a bundle 9 of fullerene wires were clearly observed 53 hours later.

Figure 3:
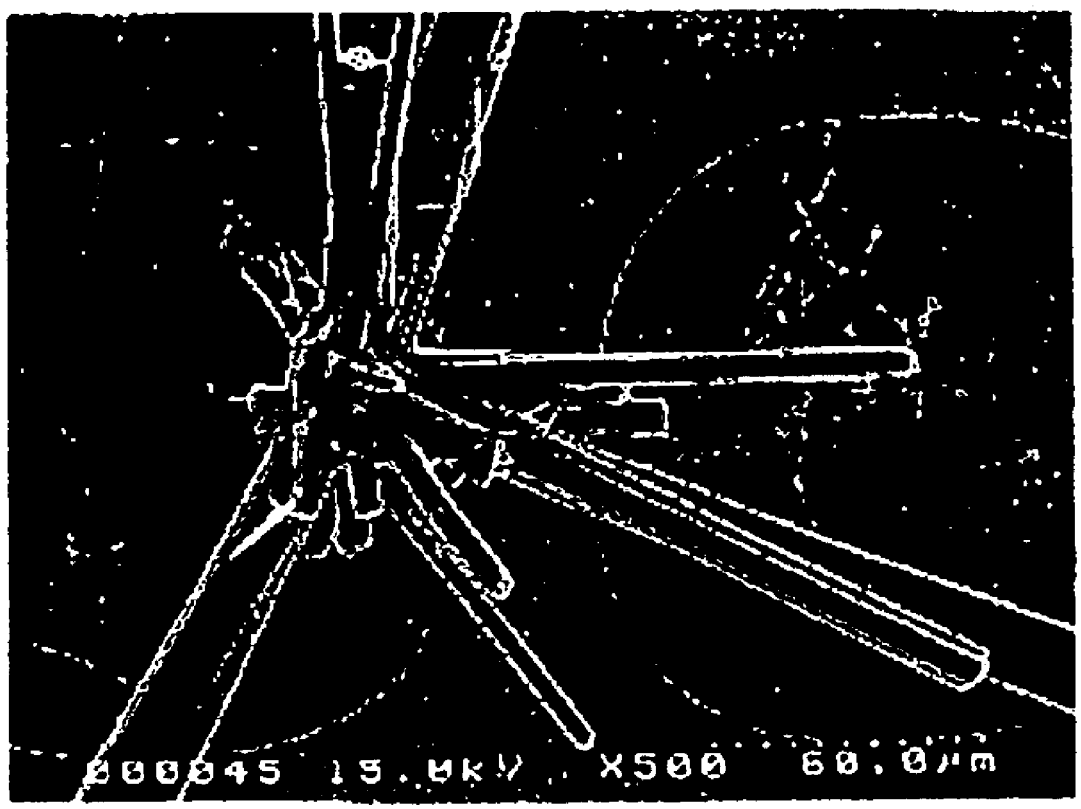
FIG. 3 is a scanning electron microscopy (SEM) image of the fullerene wire at early stages of its growth.

The fullerene wires were analyzed by scanning electron microscopy (SEM). As shown in a scanning electron micrograph of FIG. 3, the fullerene wires grew as needle-like crystals and each had a hexagonal cross section, indicating clear crystal habit.

Figure 4:
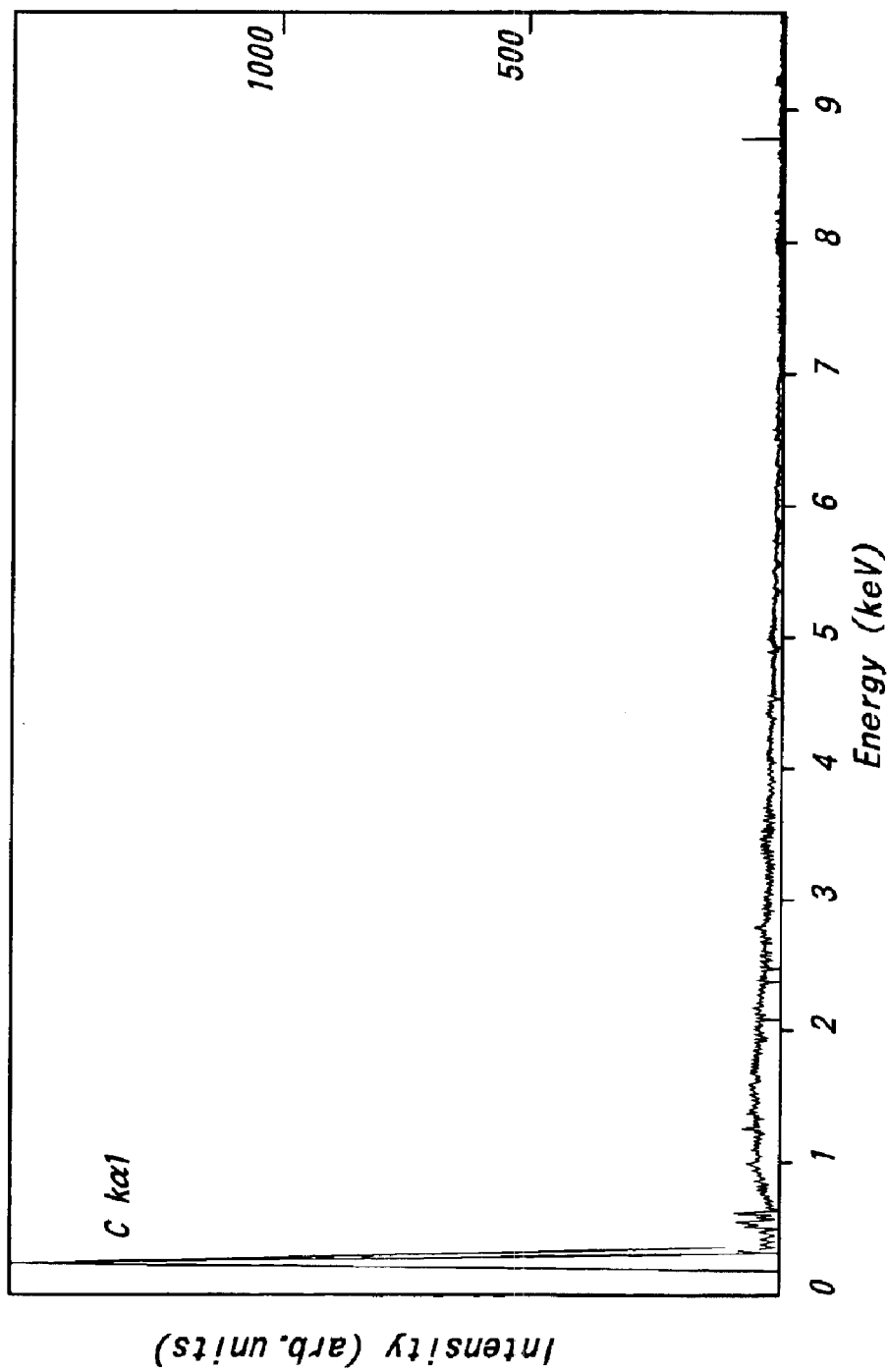
FIG. 4 is a graph showing the scanning electron microscopy-energy-dispersive X-ray analysis (SEM-EDX) of the fullerene wire.

The fullerene wires were subjected to energy-dispersive X-ray analysis (EDX) using SEM. The result is shown in FIG. 4 which indicates that the fullerene wires consist of carbon.

Example 2

The production procedure of Example 1 was repeated, except that fullerene wires were produced in large quantity using a 100-mL beaker.

As a result, fullerene wires about 2 cm long could be produced in very large quantity in a short time. A precipitated dark brown floc was observed at the bottom of the beaker. The floc could easily be separated from the fullerene wires by washing with toluene.

Most of the products were fullerene wires as in Example 1. The floc was not clearly identified but was found to be stacked fibrous fullerene based on SEM observation. The true nature of the floc will be clarified in analysis later.

Figure 5:
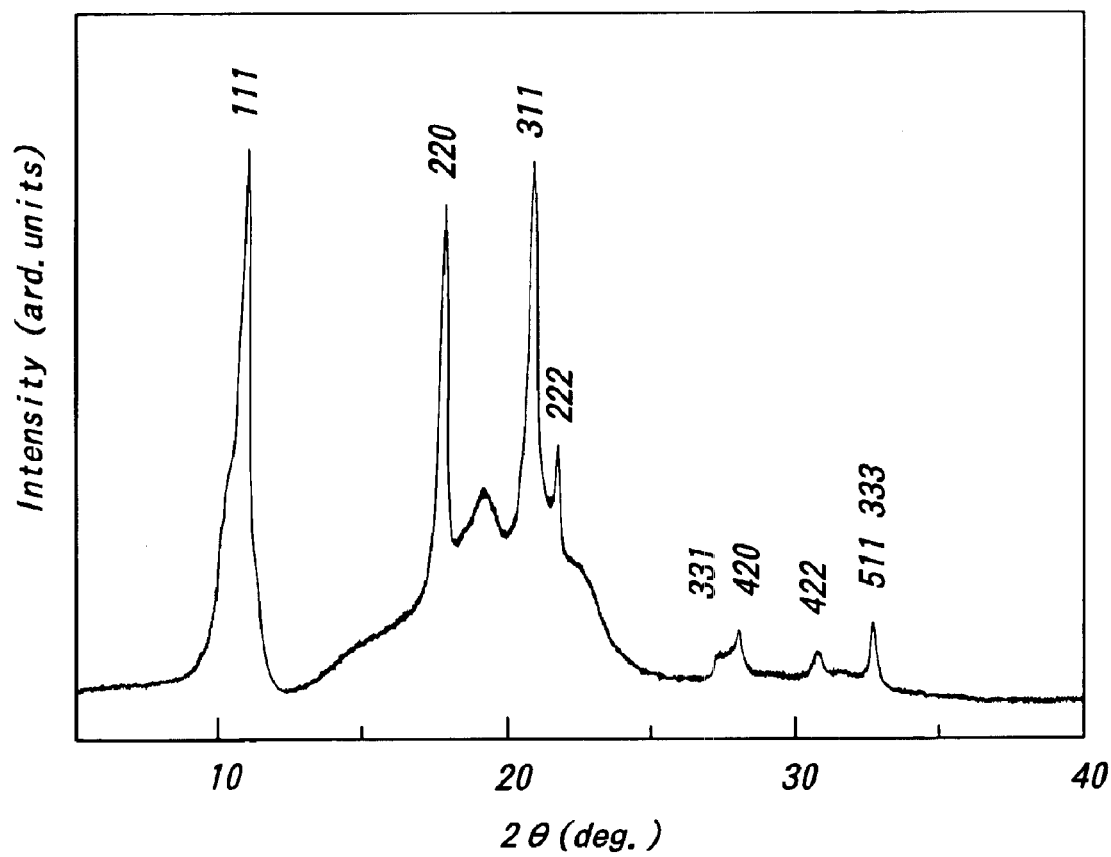
FIG. 5 is a powder X-ray diffraction pattern ($CuK_\alpha$) of the fullerene wire.

The fullerene wires were pulverized, and the resulting powdered fullerene was subjected to X-ray analysis. With reference to FIG. 5, the fullerene wires were found to be each a single crystal that can be indexed by $C_{60}$. The fullerene wires had a lattice constant slightly larger than that of pure $C_{60}$ and were therefore supposed to contain other substances (substances derived from the solvents or $C_{70}$, for example) in small amounts.

Pure $C_{60}$ has a lattice constant a of 1.412 nm in terms of a face-centered cubic crystal. The fullerene wires prepared in this example had a lattice constant a of 1.422±0.003 nm whereas it can be indexed by face-centered cubic crystal. The lattice constant of the fullerene wires was 0.01 nm larger than that of pure $C_{60}$.

These results show that the fullerene wires consist of $C_{60}$ molecules and that they have a crystal lattice as face-centered cubic crystal that is almost the same as in the original $C_{60}$ molecules.

The results indicate that $C_{60}$ molecules have large intermolecular interstices, and the solvent components and $C_{70}$ and other higher fullerenes contained in the material $C_{60}$ enter the interstices to thereby yield a substance indicated by $C_{60}+X$, wherein X is, for example, the solvent molecule or higher fullerene. Support for these assumptions will be found in structural analysis such as thermal analysis or high-resolution transmittance electron microscopic observation later.

Figure 6:
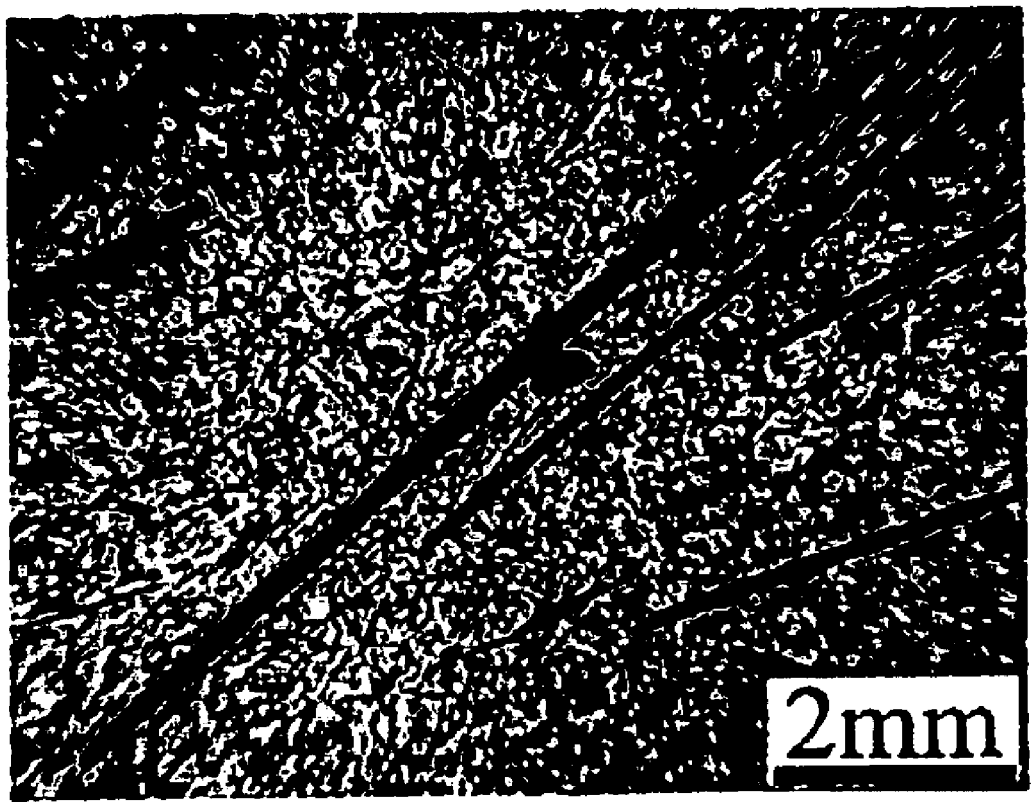
FIG. 6 is a stereoscopic microscopy image of a grown fullerene wire.

The grown fullerene wires were observed using a stereoscopic microscope. As shown in FIG. 6, the fullerene wires each had a diameter of about 200 $\mu$m and a length of about 10 mm.

The fullerene wires of the present invention can grow to a length on the order of several millimeters to centimeters and can grow at a rate on the order of about 200 $\mu mh^{-1}$ surpassing the rate, 4 $\mu mh^{-1}$, of conventional equivalents.

Example 3

In this example, fullerene whiskers as shown in FIGS. 7 through 13D were produced to verify that the floc obtained in Example 2 was a fullerene nanowhisker.

A total of 50 mL of a saturated solution of $C_{60}$ as the fullerene in toluene was placed in a 100-mL beaker at room temperature (about 21° C.), followed by gently pouring isopropyl alcohol to thereby form an interface between the saturated $C_{60}$ toluene solution and isopropyl alcohol.

Figure 7:
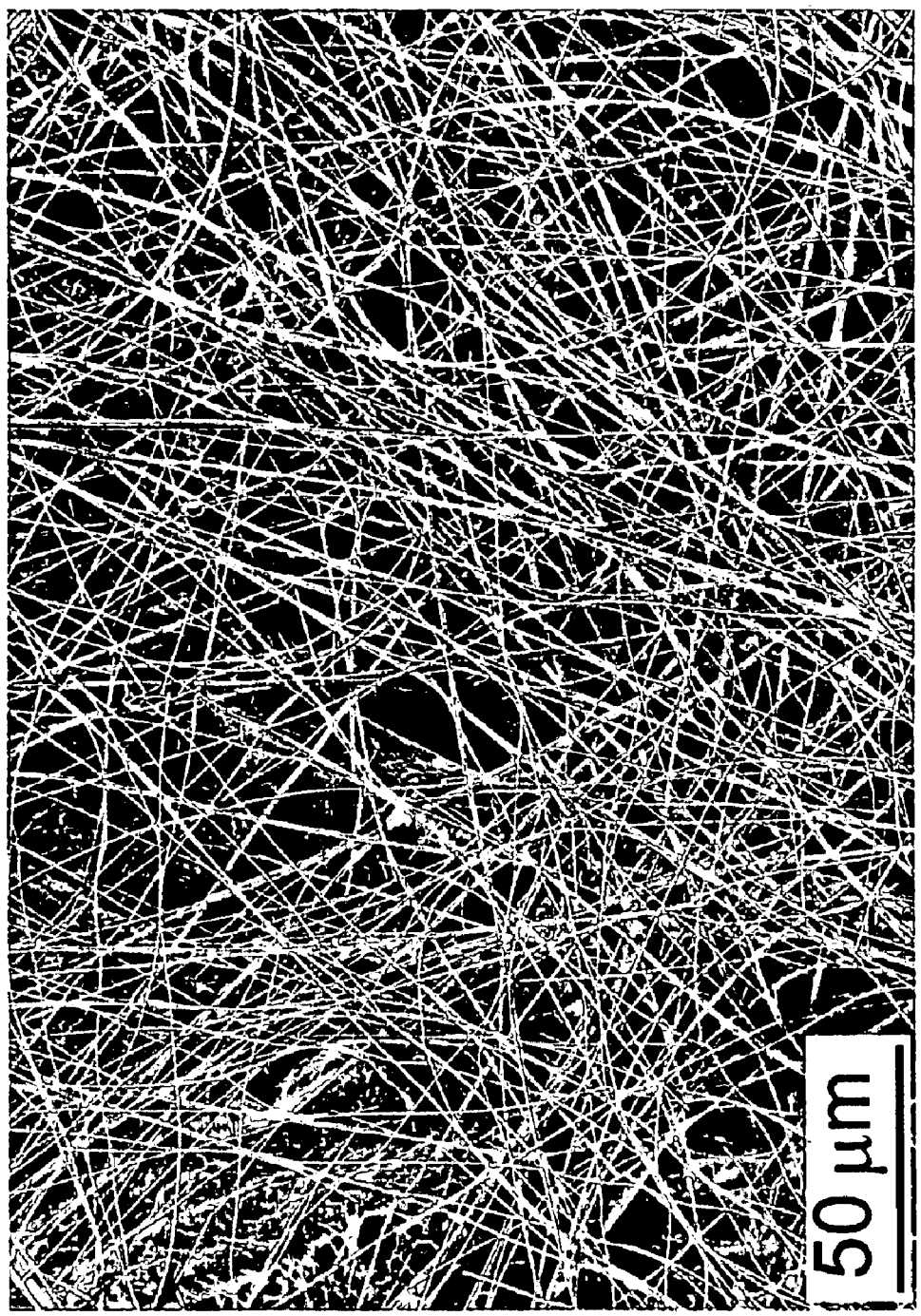
FIG. 7 is a scanning electron microscopy image of $C_{60}$ whiskers and $C_{60}$ nanowhiskers (indicated by the arrow)
Figure 8:
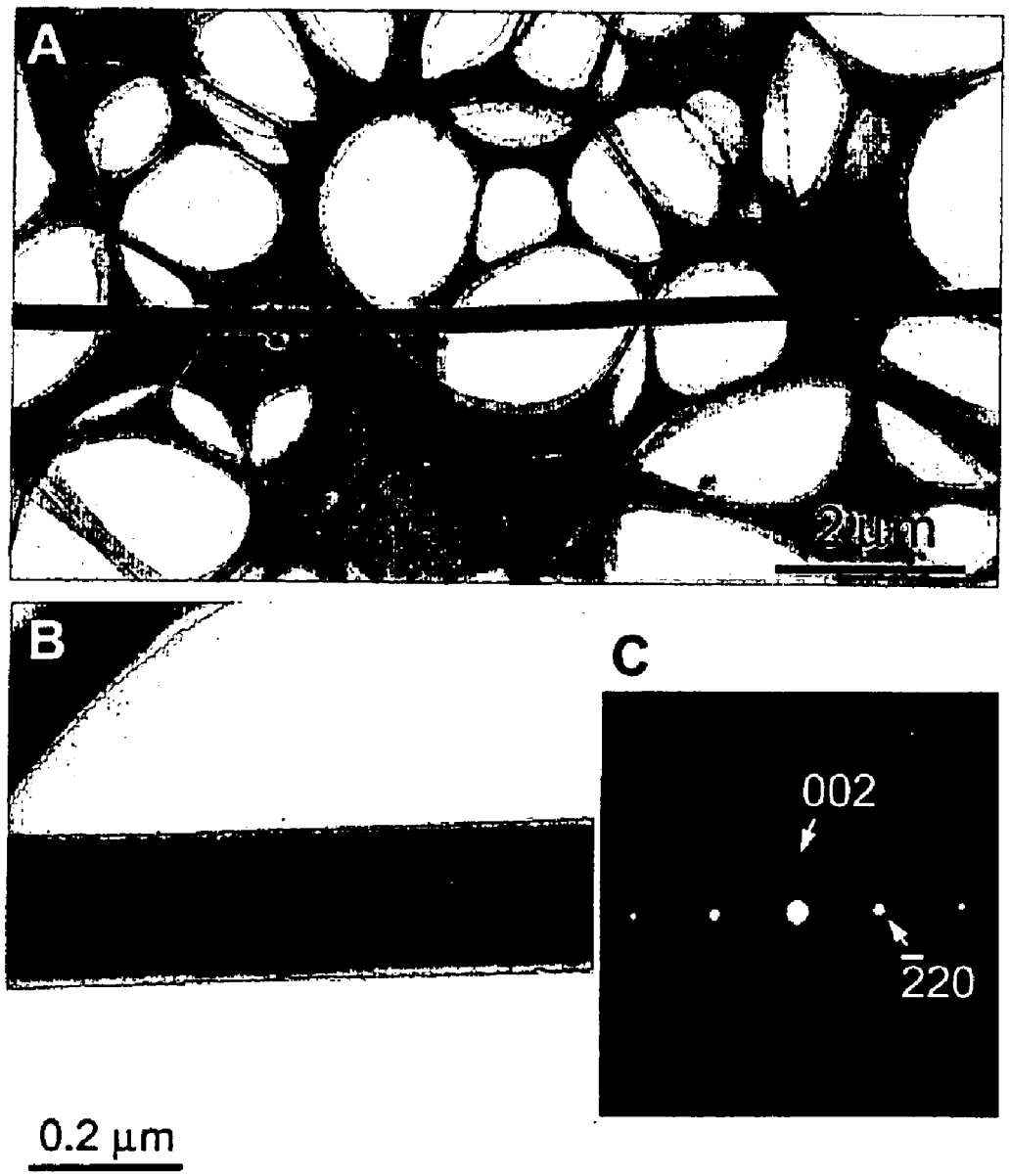
FIGS. 8A and 8B are bright-field transmission electron micrographs.
FIG. 8C is a selected-area electron diffraction pattern, of the $C_{60}$ nanowhiskers.

Immediately after addition of isopropyl alcohol, $C_{60}$ whiskers and $C_{60}$ nanowhiskers ($C_{60}$ NWs) were formed. FIG. 7 is a scanning electron micrograph (SEM) of the $C_{60}$ whiskers and nanowhiskers. In FIG. 7, needle-like crystals having a submicron diameter are $C_{60}$ nanowhiskers.

As shown in the transmission electron micrograph (TEM) of FIG. 8A, the $C_{60}$ nanowhiskers each had a diameter of about 200 nm. The selected-area electron diffraction pattern (SAEDP) of FIG. 8C and the bright-field pattern as in an enlarged view of FIG. 8B showing a continuous extinction fringe verify that the $C_{60}$ nanowhiskers were each a single crystal.

Figure 9:
FIG. 9 is a scanning electron micrograph of cross sections of the $C_{60}$ nanowhiskers.

The $C_{60}$ nanowhiskers had a growth axis of [110]c in terms of a cubic crystal. They had a $C_{60}$ intermolecular distance along the [110]c growth axis 1% to 4% less than that of $C_{60}$ molecular crystals of a face-centered cubic (FCC) structure, indicating that the $C_{60}$ molecules yielded a chemical bond different from van der Waals bond and are polymerized in the growth axis direction. The scanning electron micrograph of FIG. 9 shows that the $C_{60}$ nanowhiskers had a dense structure as shown in the fractures.

Combinations of solvents for use in the preparation of fullerene whiskers include any combinations, as long as they are combinations of good solvents for fullerenes such as toluene with poor solvents for fullerenes such as isopropyl alcohol and can form a liquid-liquid interface.

Figure 10:
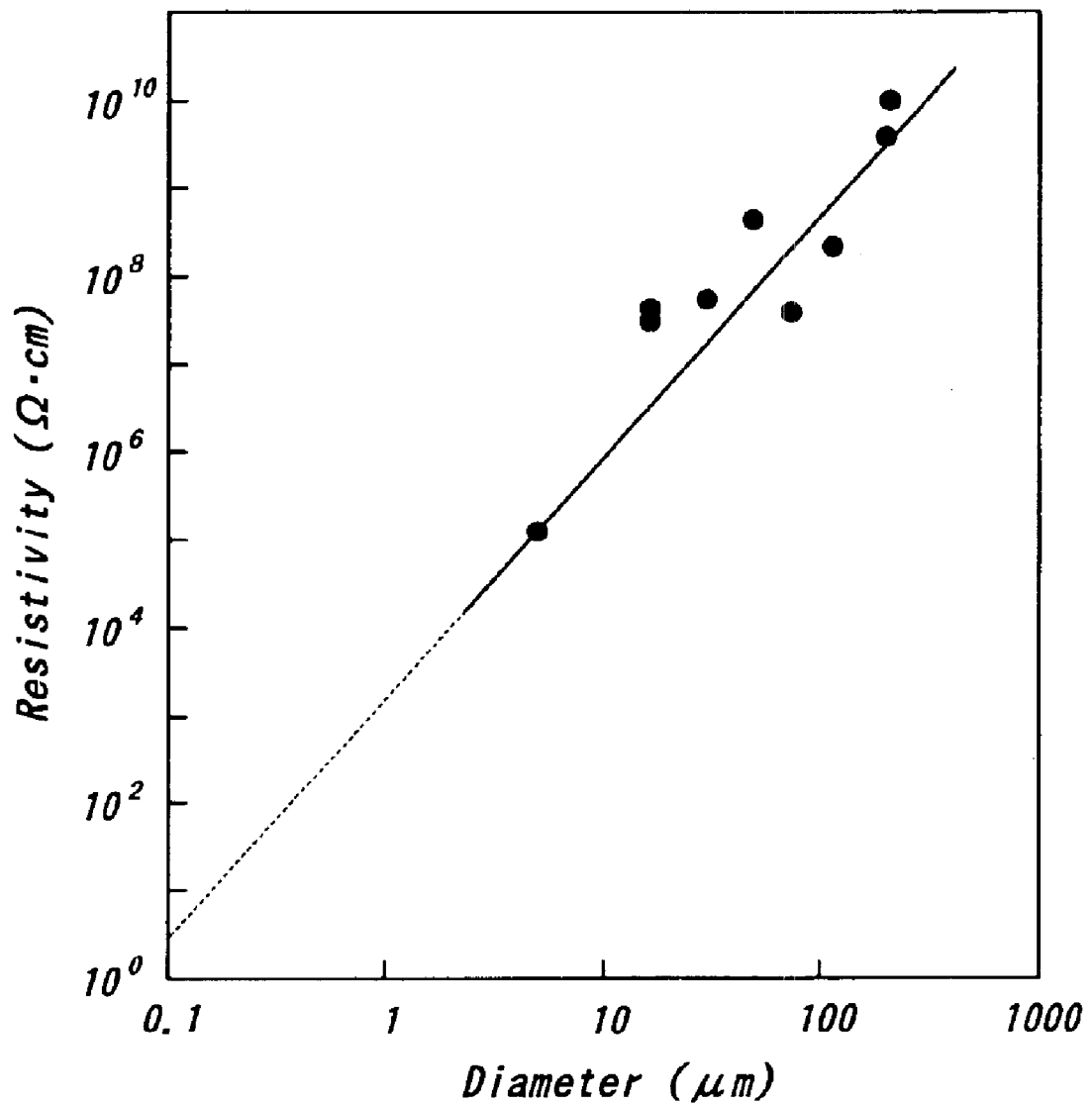
FIG. 10 is a graph showing the relationship between diameter and resistivity of $C_{60}$ whiskers and $C_{60}$ nanowhiskers.

The relationship between the diameter and resistivity was determined on $C_{60}$ needle-like crystals having different diameters. As shown in FIG. 10, a $C_{60}$ whisker having a diameter of 100 μm or more is almost insulative, whereas its resistivity significantly decreases with a decreasing diameter of the $C_{60}$ whisker. A $C_{60}$ nanowhisker having a diameter on the order of 100 nanometers or less is expected to have a low resistivity on the order of 1 Ωcm or less.

Figure 11:
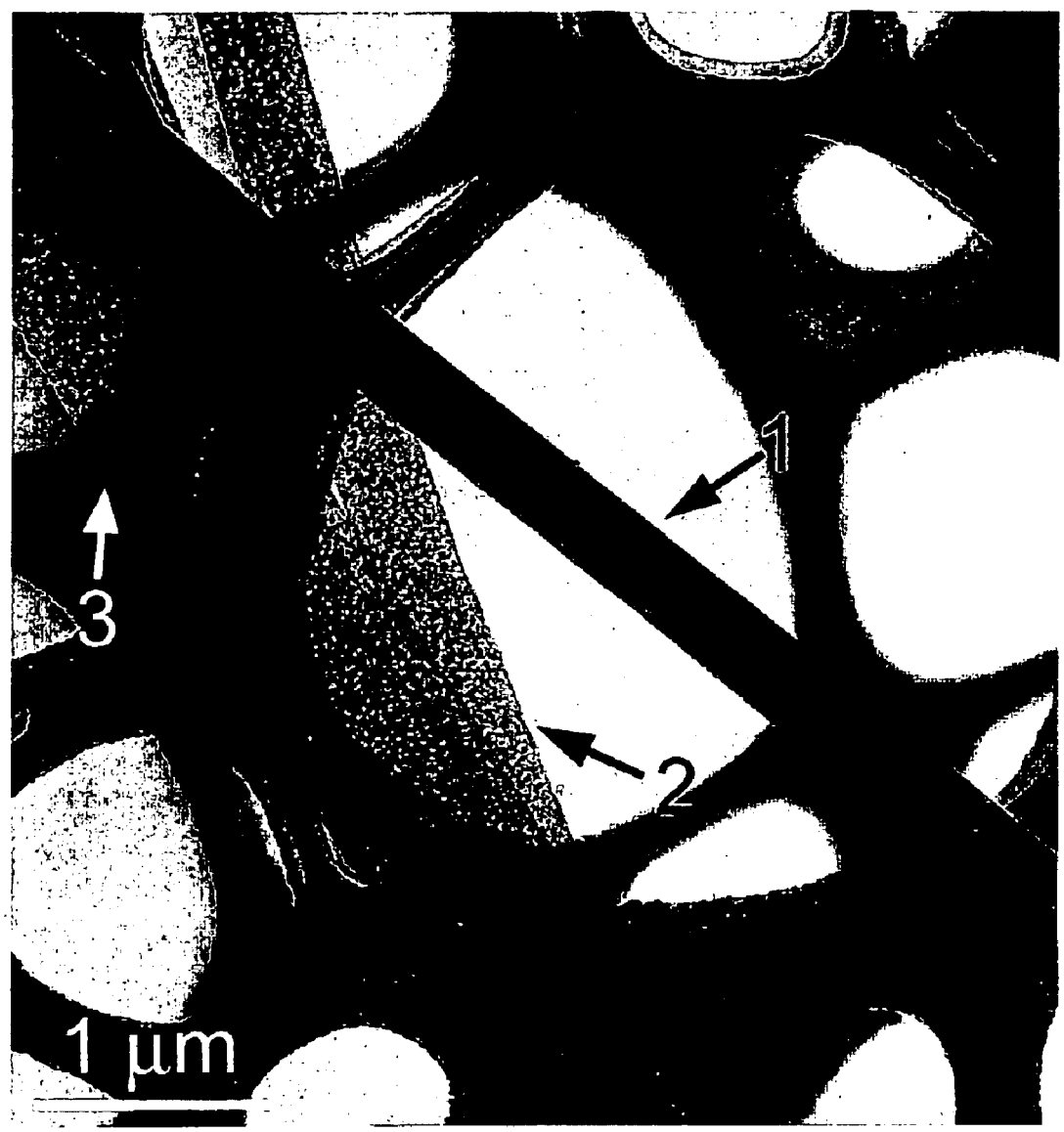
FIG. 11 is a transmission electron micrograph of the $C_{60}$ nanowhiskers.
Figure 12:
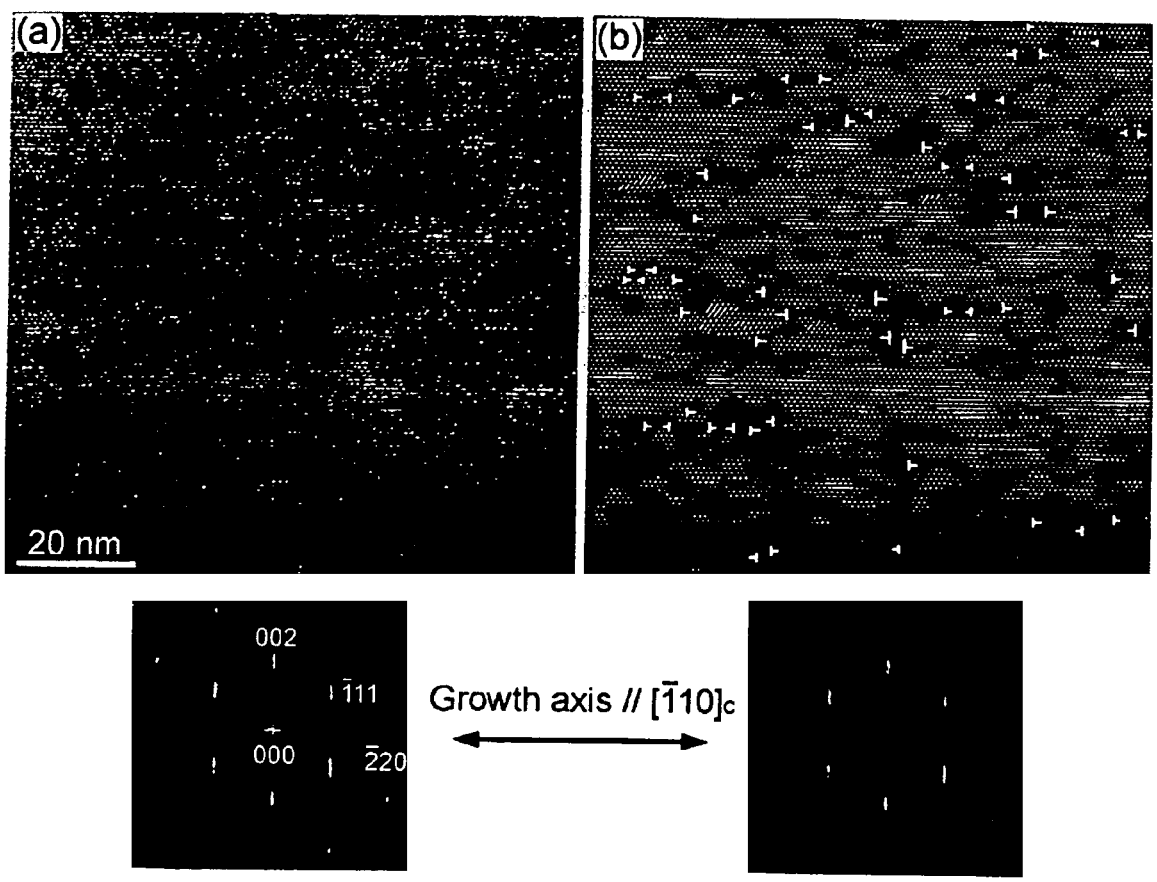
FIGS. 12A and 12B are each a high resolution transmission electron micrograph of the $C_{60}$ nanowhiskers and a filter-inversion fast Fourier transform (FFT) pattern of FIG. 12A, respectively.
Figure 13:
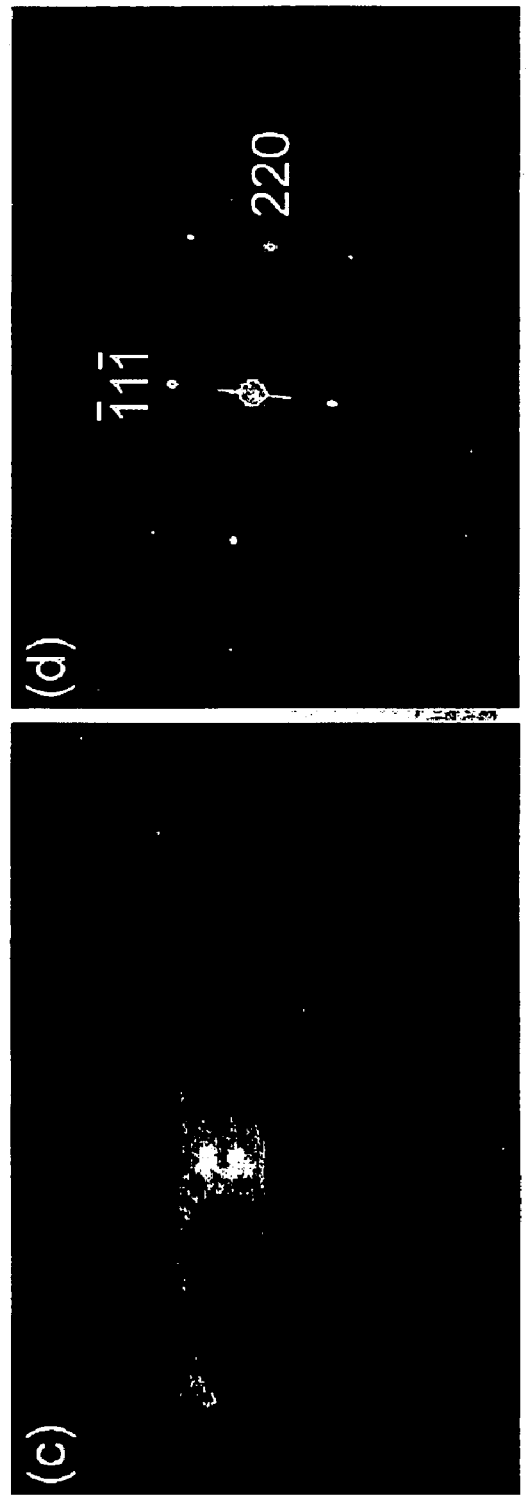
FIGS. 13A through 13D are transmission electron micrographs showing a tip, an enlarged image of the tip, a dark-field image, and a selected area diffraction pattern, respectively, of the $C_{60}$ nanowhiskers.
Figure 13:
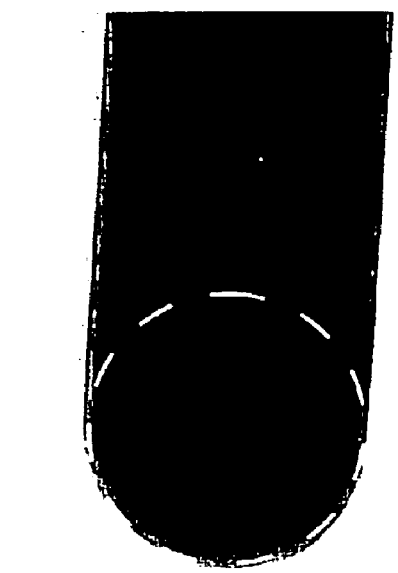
Figure 13:

As shown in the transmission electron micrograph of FIG. 11, a $C_{60}$ nanowhisker (indicated by the arrow 1) having a small diameter was not damaged by radiation, but those having large diameters as indicated by the arrows 2 and 3 were damaged by radiation at an equivalent electron beam radiant exposure. This is probably because the thin $C_{60}$ nanowhisker allows electricity to pass therethrough and the surface of the sample does not become charged, thus causing no radiation damage.

FIGS. 12A and 12B are each high-resolution transmission electron microscopy (HRTEM) images of the $C_{60}$ nanowhiskers before and after undergoing filtering and fast inverse Fourier transform, respectively. With reference to FIG. 12B, a highly dense edge dislocation was introduced, and there were a lot of plane defects in the (002) plane, indicating that the (002) plane parallel with the growth axis yielded stacking fault.

The many stacking defects of the (002) plane show that the (002) plane becomes a low-energy interface. The fact that the surface of the $C_{60}$ nanowhisker is covered with the (002) low-energy plane is not contradictory to the fact that the growth axis is the [110] axis.

The introduced lattice dislocation means that the $C_{60}$ nanowhiskers can be plastically deformed and that they can undergo plastic working into various shapes such as coil shapes.

The $C_{60}$ nanowhiskers do not decompose at temperatures lower than about 450° C. even in the air and can be plastically processed by elevating the temperature thereof to those at which the dislocation easily occurs. By subjecting the $C_{60}$ nanowhiskers to plastic working at high temperatures, quenching the same and thereby fixing lattice defects such as dislocation, the hardness would be further increased.

FIGS. 13A and 13B are each a transmission electron micrograph of the tip of the $C_{60}$ nanowhiskers. The $C_{60}$ nanowhiskers each had a nearly spherical tip and can be used as the probes of tracer sensors each having a smooth tip with low friction coefficient.

As thus described, the $C_{60}$ nanowhiskers are very promising fine carbon wires of conductive carbon polymer single crystals. In addition, all the $C_{60}$ whiskers including such $C_{60}$ nanowhiskers can undergo plastic working and each have a smooth surface.

Example 4

Figure 14:
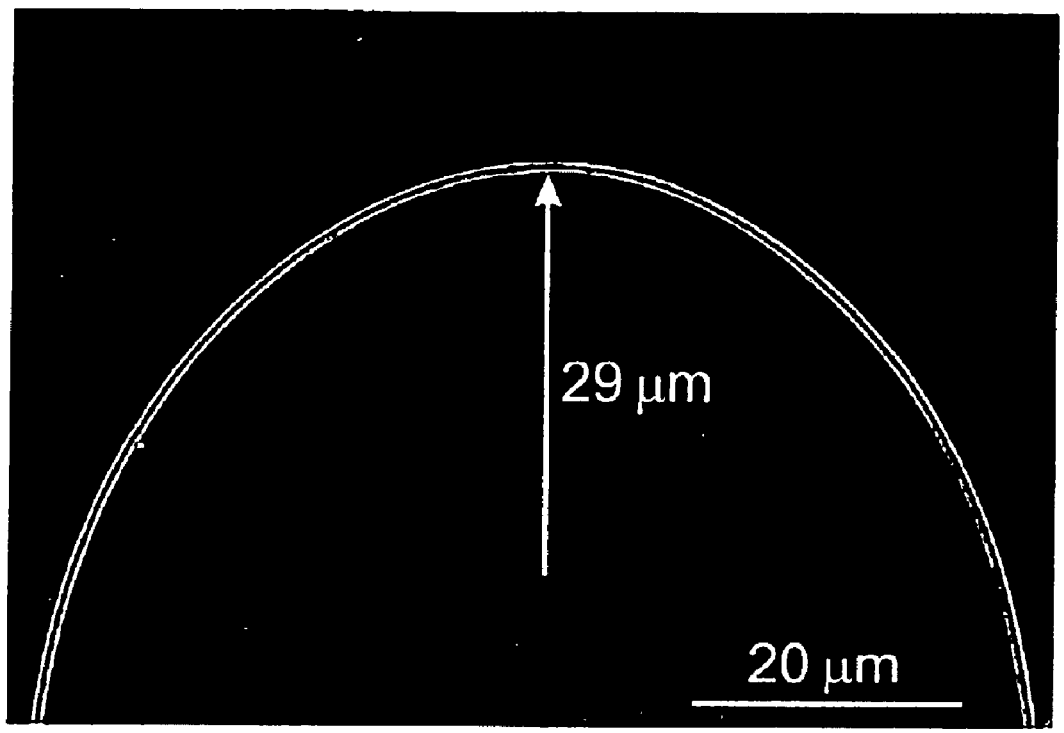
FIG. 14 is a scanning electron micrograph of a bent $C_{60}$ nanowhisker.
Figure 15:
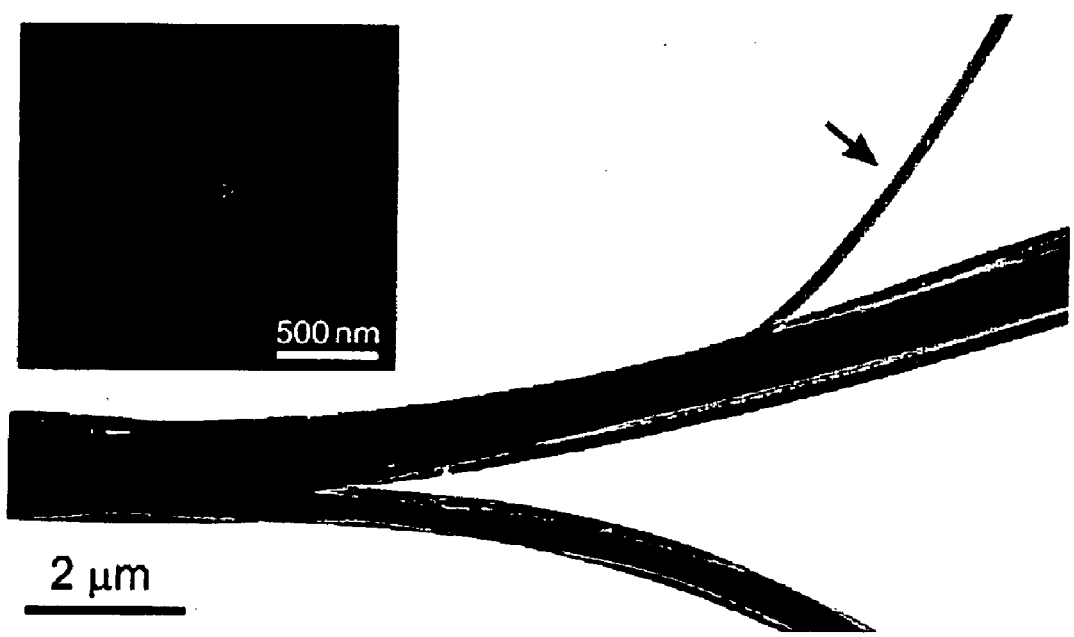
FIG. 15 is a transmission electron micrograph of a bent $C_{60}$ whisker.

With reference to FIGS. 14 and 15, characteristics of the $C_{60}$ nanowhiskers in bending deformation were determined. Such $C_{60}$ whiskers prepared by liquid-liquid interface deposition are supposed to have a structure consisting of multi-layered laminae and are supposed to flexibly deform. In this example, the structure of a bent $C_{60}$ whisker was determined.

A whisker of $C_{60}$ was prepared according to the liquid-liquid interface deposition process in which isopropyl alcohol was carefully placed onto a saturated $C_{60}$ solution in toluene to thereby form an interface. The resulting whisker was bent on a grid of TEM and was then fixed.

As shown in FIG. 14, the $C_{60}$ nanowhisker ($C_{60}$ NW) having a diameter of 530 nm could be bent with a radius of curvature of 29 μm. As shown in FIG. 15, the $C_{60}$ whisker undergoing strong bending deformation did not rupture but separated into fine $C_{60}$ nanowhiskers.

Example 5

$C_{60}$ and $C_{70}$ nanowhiskers were synthesized in liquid phases, as shown in FIGS. 16 through 20B. The present inventors have found that $C_{60}$ whiskers having a submicron diameter ($C_{60}$ nanowhiskers) are formed in a mixture of a lead zirconate titanate (PZT) sol with a $C_{60}$ solution in toluene (K. Miyazawa et al., J. Am. Ceram. Soc., 84[12] (2001) 3037).

They also have found that such $C_{60}$ nanowhiskers can be prepared by a method using a liquid-liquid interface between a saturated $C_{60}$ toluene solution and isopropyl alcohol (liquid-liquid deposition method) (K. Miyazawa et al., J. Mater. Res., 17[1] (2002) 83).

In this example, iodine was doped into $C_{60}$ nanowhiskers, and $C_{70}$ whiskers were prepared in the liquid-liquid interface deposition process.

Iodine was doped by adding a solution of iodine in isopropyl alcohol to a $C_{60}$ solution in toluene. The $C_{70}$ nanowhiskers were prepared by adding isopropyl alcohol to a $C_{70}$ solution in toluene.

Figure 16:
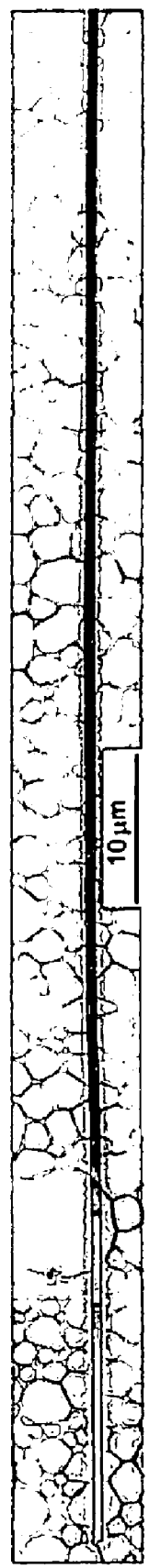
FIG. 16 is a transmission electron micrograph of an iodine-doped $C_{60}$ nanowhisker.
Figure 17:
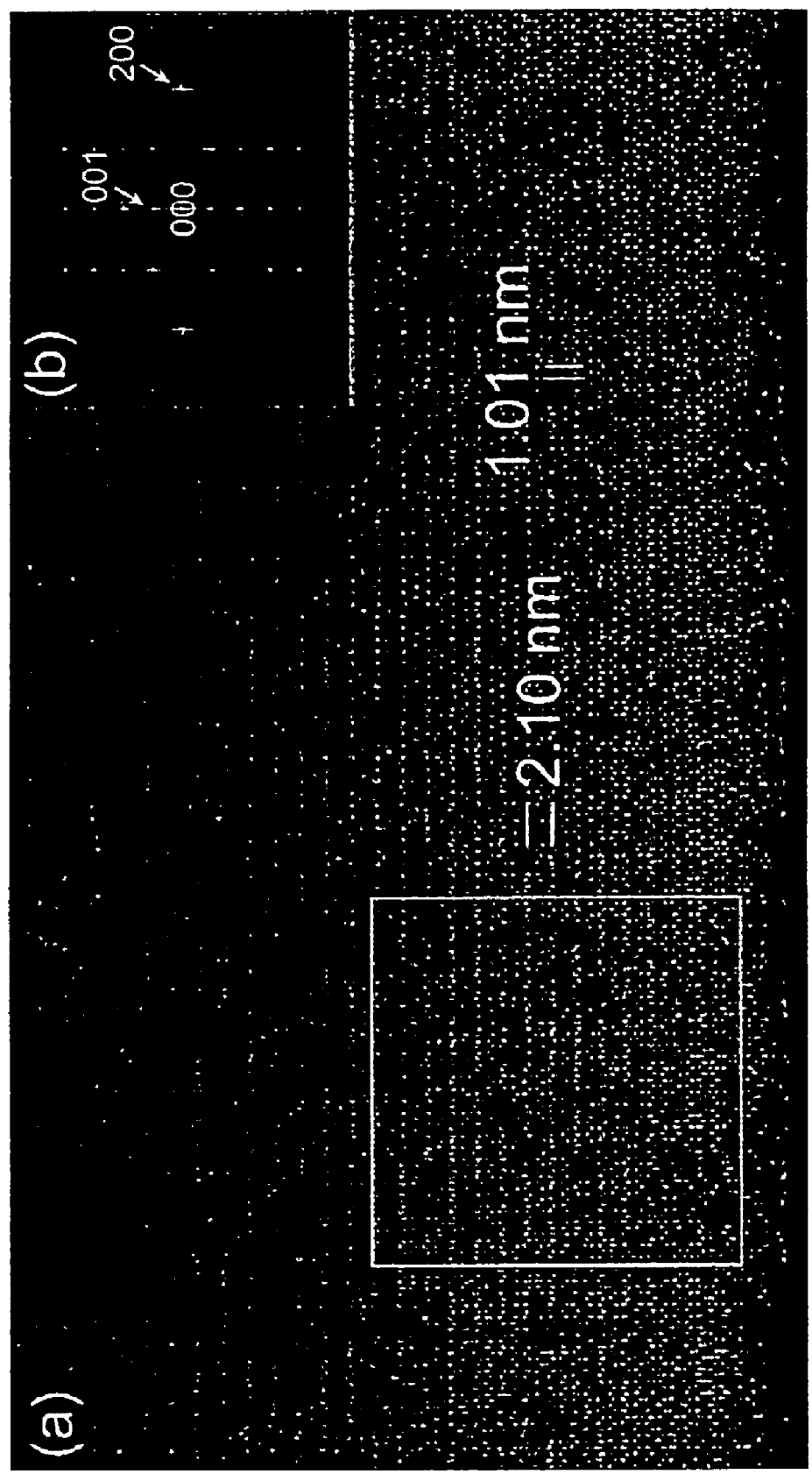
FIGS. 17A and 17B are each a high-resolution transmission electron micrograph and a fast Fourier transform pattern, respectively, of the iodine-doped $C_{60}$ nanowhisker.

As a result, iodine-doped $C_{60}$ nanowhiskers (I-$C_{60}$ NWs) each having a diameter of 790 nm and a length of 100 μm or more were obtained as shown in FIG. 16.

As shown in the HRTEM image of FIG. 17A, the I-$C_{60}$ nanowhisker had a structure in which the (002)t plane having different interplanar spacings (0.87 nm and 1.16 nm) were alternately laminated, and the growth axis of the whisker was in the close-packed direction of $C_{60}$.

Figure 18:
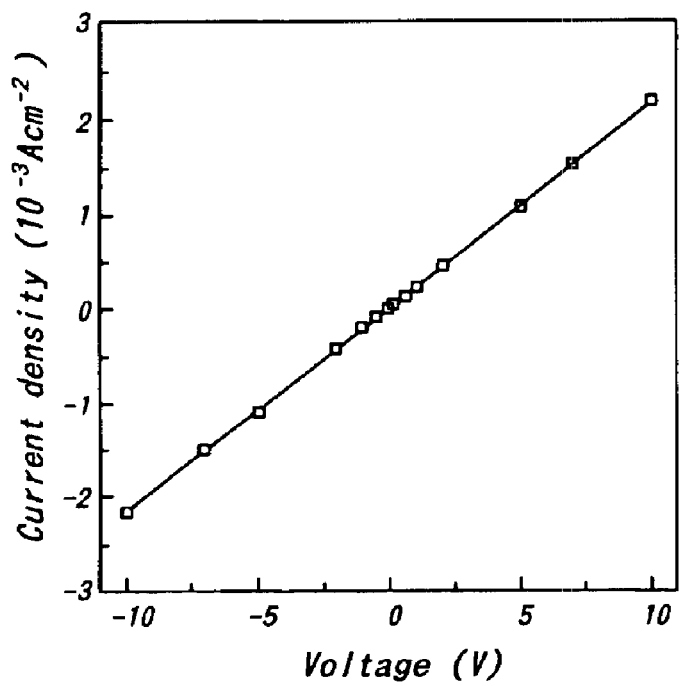
FIG. 18 is a current-voltage characteristics curve (I-V curve) of a $C_{60}$ whisker having a diameter of 5 $\mu$m.
Figure 19:
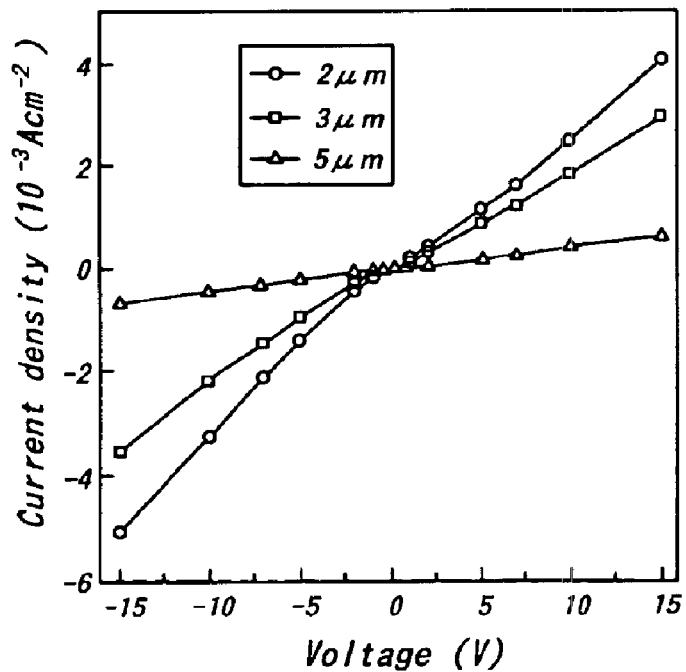
FIG. 19 is I-V curves of iodine-doped whiskers having a diameter of 2 $\mu$m, 3 $\mu$m and 5 $\mu$m, respectively.
Figure 20:
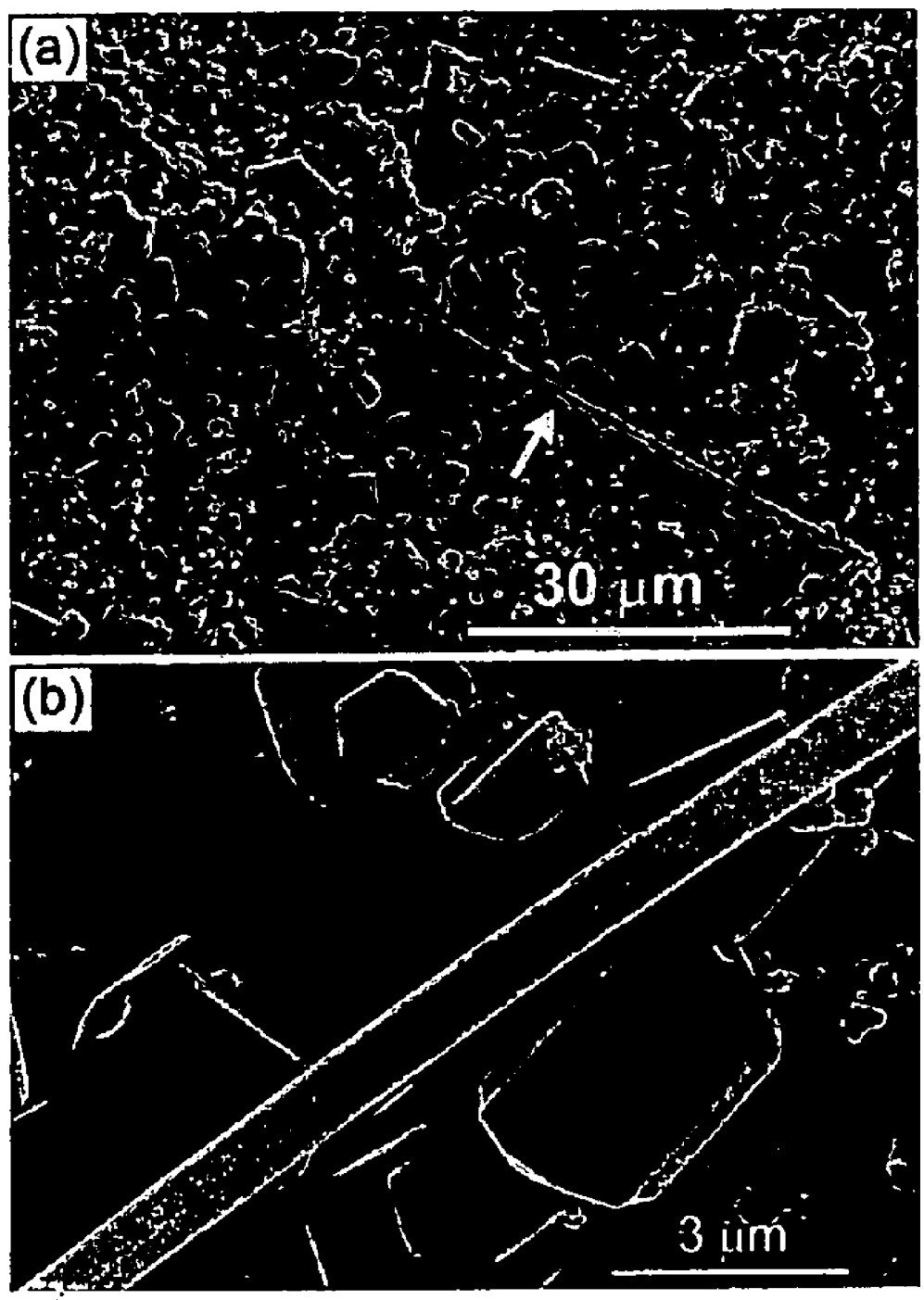
FIGS. 20A and 20B are each a scanning electron micrograph and an enlarged view thereof, respectively, of a needle-like single $C_{70}$ crystal (indicated by the arrow)

FIGS. 18 and 19 are I-V curves of a $C_{60}$ whisker having a diameter of 5 μm, and of iodine-doped $C_{60}$ whiskers having a diameter of 2 μm, 3 μm and 5 μm, respectively. The $C_{60}$ whisker showed a linear I-V characteristics and, in contrast, the iodine-doped $C_{60}$ whiskers showed non-linear I-V characteristics, indicating that the doped iodine yielded carriers.

Preparation of $C_{70}$ Whiskers from a Concentrated Solution

Powdered $C_{70}$ was pulverized in a mortar, was dissolved in toluene by ultrasonic irradiation for 30 minutes and thereby yielded 0.001 molL$^{-1}$ saturated $C_{70}$ solution in toluene. A total of 5 mL of the prepared saturated solution was dispensed in a 10-mL glass bottle, and careful placement of 5 mL of isopropyl alcohol thereon yielded a liquid-liquid interface between the saturated $C_{70}$ toluene solution and isopropyl alcohol. The glass bottle was allowed to stand at room temperature of about 21° C. for a day and thereby yielded a deposit. FIGS. 20A and 20B are scanning electron micrographs (SEM) of needle-like single $C_{70}$ crystals each having a length of equal to or more than 90 μm, i.e., single-crystalline $C_{70}$ whiskers. In this procedure, fine crystalline deposits derived from $C_{70}$ were formed in addition to the needle-like $C_{70}$ crystals. The resulting needle-like $C_{70}$ crystals had an average diameter of 1096±292 nm on an average of 25 samples. Table 1 shows the interplanar spacing of the needle-like $C_{70}$ crystals.

TABLE 1

Interplanar Spacing of Needle-like single $C_{70}$ Crystals as Observed by TEM

| Miller Indices (hkl) | dhkl (nm) |
|---|---|
| (111) | 0.965 ± 0.049 |
| (002) | 0.896 ± 0.079 |
| (220) | 0.577 ± 0.025 |

The spacing ($d_{220}$, 0.577 nm) of the (220) plane was near to the interplanar spacing ($d_{220}$, 0.5294 nm) of a corresponding pure face-centered cubic (fcc) $C_{70}$ crystal (lattice constant a=1.4974 nm). All the growth axes of the needle-like single $C_{70}$ crystals were in parallel with the <110> orientation, the close-packed direction of the $C_{70}$ molecules.

Preparation of $C_{70}$ Whiskers from a Dilute Solution

Powdered $C_{70}$ was pulverized in a mortar, was dissolved in toluene by ultrasonic irradiation for 30 minutes and thereby yielded 0.001 molL$^{-1}$ saturated solution of $C_{70}$ in toluene. The prepared saturated solution was diluted two folds. A total of 5 mL of the diluted solution was dispensed in a 10-mL glass bottle, and careful placement of isopropyl alcohol thereon yielded a liquid-liquid interface between the $C_{70}$ toluene solution and isopropyl alcohol. After the formation of the liquid-liquid interface, the glass bottle was allowed to stand at room temperature of about 21° C. for 7 days and thereby yielded needle-like $C_{70}$ crystals.

Figure 21:
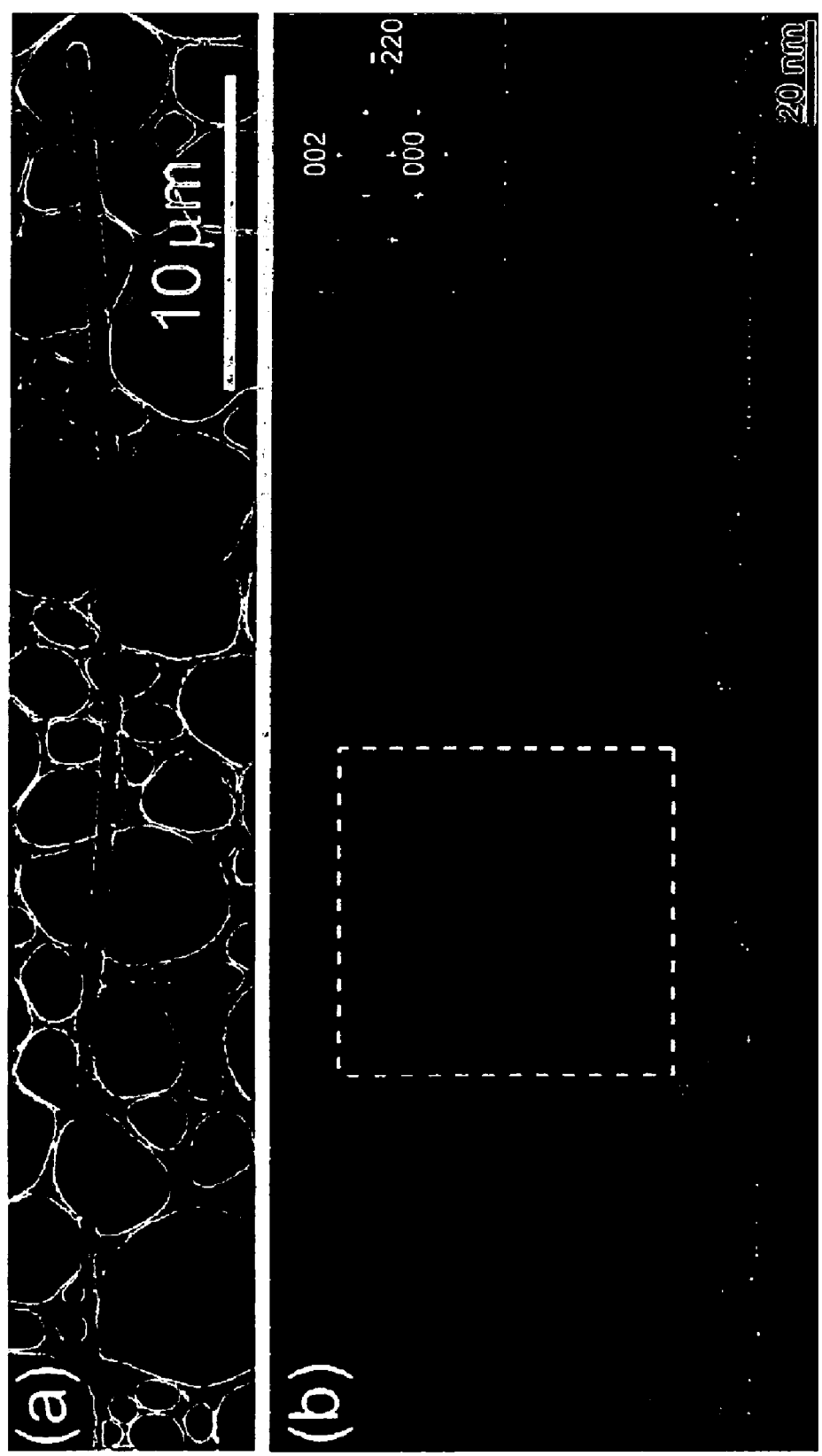
FIGS. 21A and 21B are a scanning electron micrograph, and a high-resolution transmission electron micrograph and fast Fourier transform patter thereof, respectively, of a $C_{70}$ nanowhisker.

As shown in FIG. 21A, $C_{70}$ nanowhiskers were successfully obtained. The HRTEM image in FIG. 21B shows that the growth axes of the $C_{70}$ nanowhiskers were in the closest packing direction of the $C_{70}$ molecules.

Figure 22:
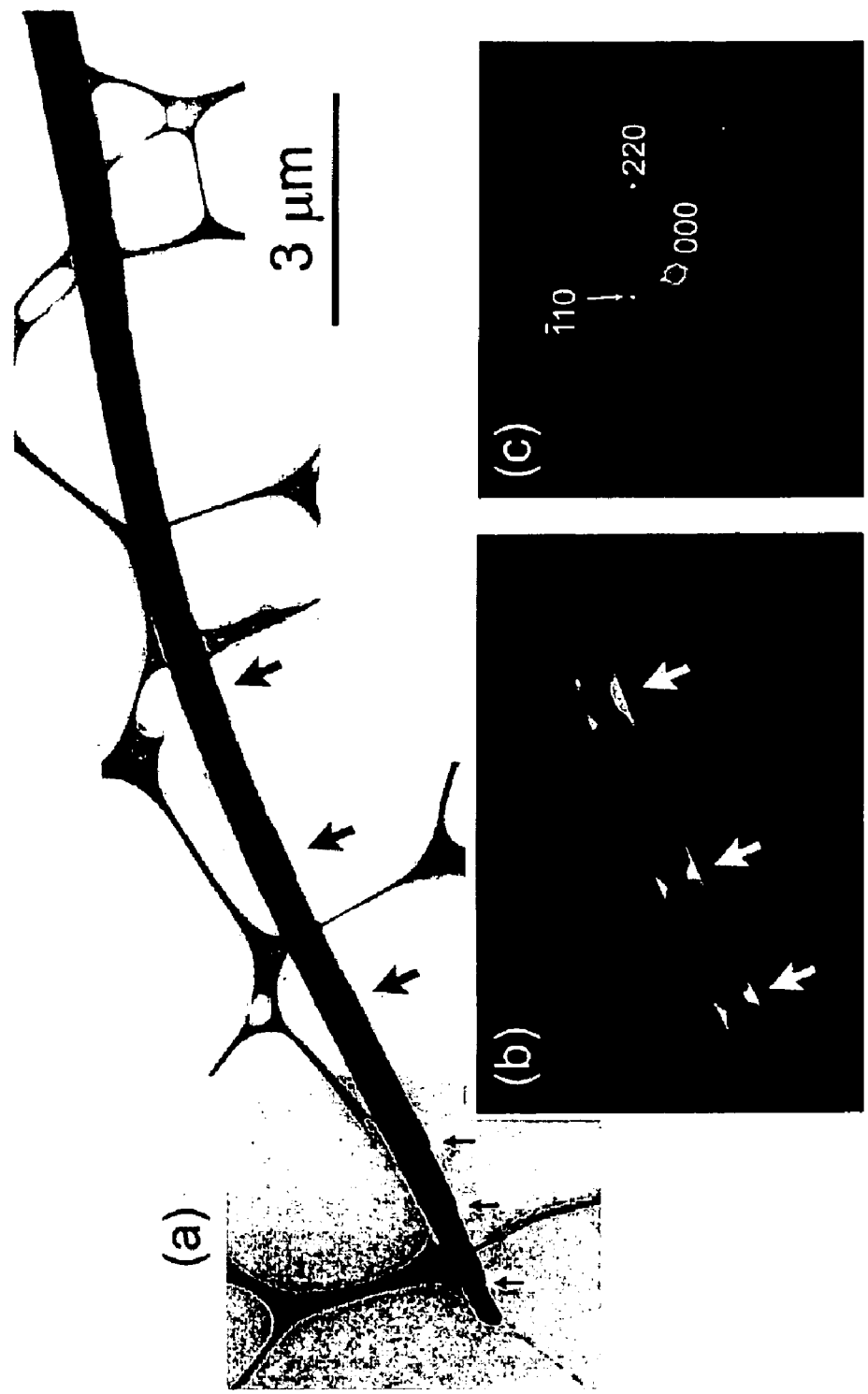
FIGS. 22A, 22B and 22C are a bright-field transmission electron micrograph, a dark-field pattern thereof and an electron diffraction pattern, respectively, of a $C_{70}$ nanowhisker.

FIG. 22A shows the TEM image of a needle-like single $C_{70}$ crystal ($C_{70}$ nanowhisker, $C_{70}$ NW) having a submicron diameter. The continuous extinction fringes as shown by the thick arrows in FIGS. 22A and 22B show that this crystal is a single $C_{70}$ crystal. The electron diffraction pattern in FIG. 22C shows that the growth axis of the $C_{70}$ nanowhisker is in the [110] direction.

Figure 23:
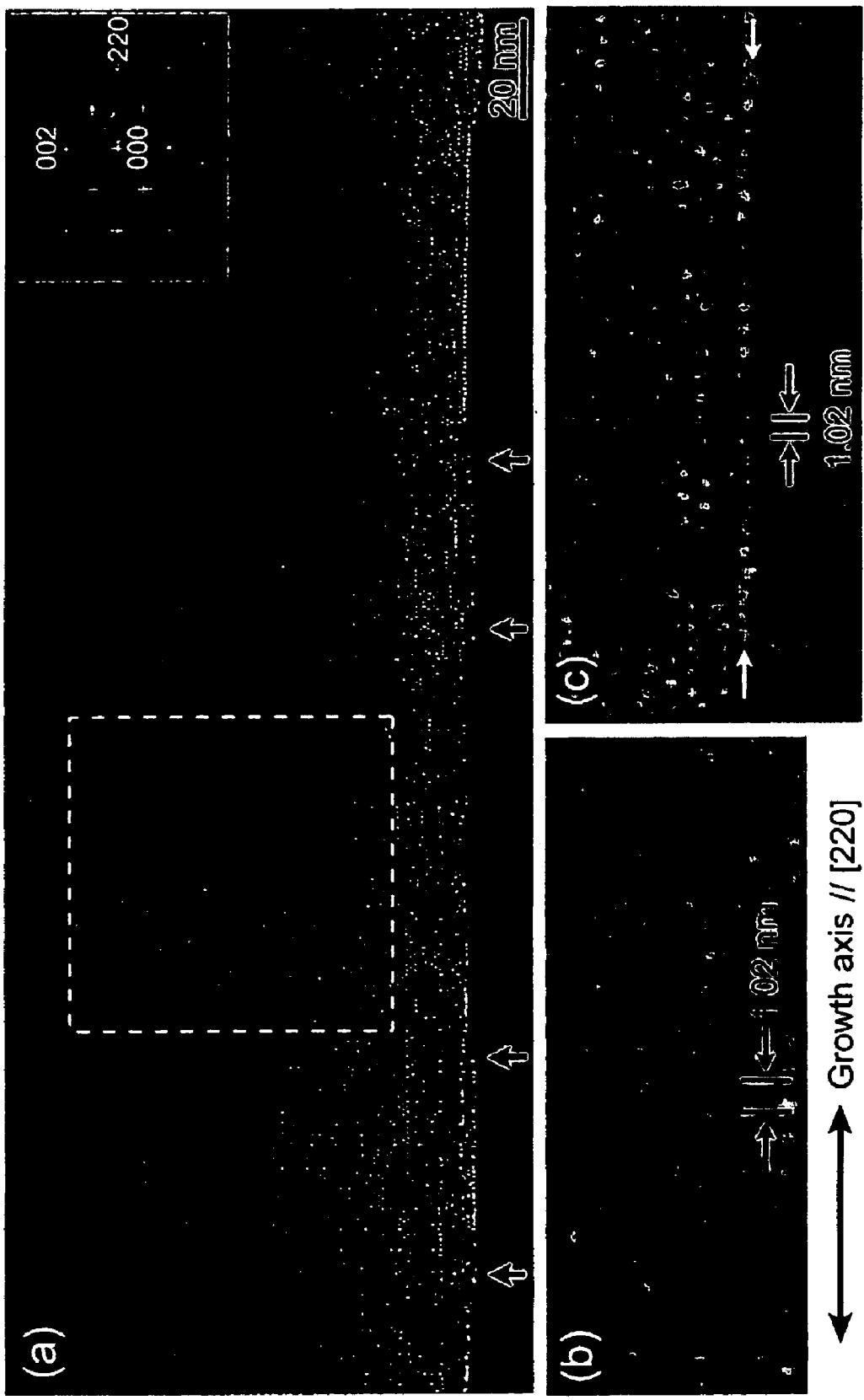
FIGS. 23A, 23B and 23C are a high-resolution transmission electron micrograph with a fast Fourier transform pattern of the area within dotted white lines, and enlarged views thereof, respectively, of the $C_{70}$ nanowhisker.

FIGS. 23A, 23B and 23C are high-resolution transmission electron micrographs (HRTEM images) of the $C_{70}$ nanowhisker. FIG. 23A shows that the $C_{70}$ nanowhisker has a very smooth surface, whereas a step is formed at the position indicated by the arrow in the figure, but this step have a height of at most about 1 nm. FIG. 23B shows that the $C_{70}$ molecule has an intermolecular spacing of 1.02 nm in the growth axis direction. The white arrow in FIG. 23C shows that the $C_{70}$ nanowhisker has a growth axis in the closest packing direction of the $C_{70}$ molecules.

Figure 24:
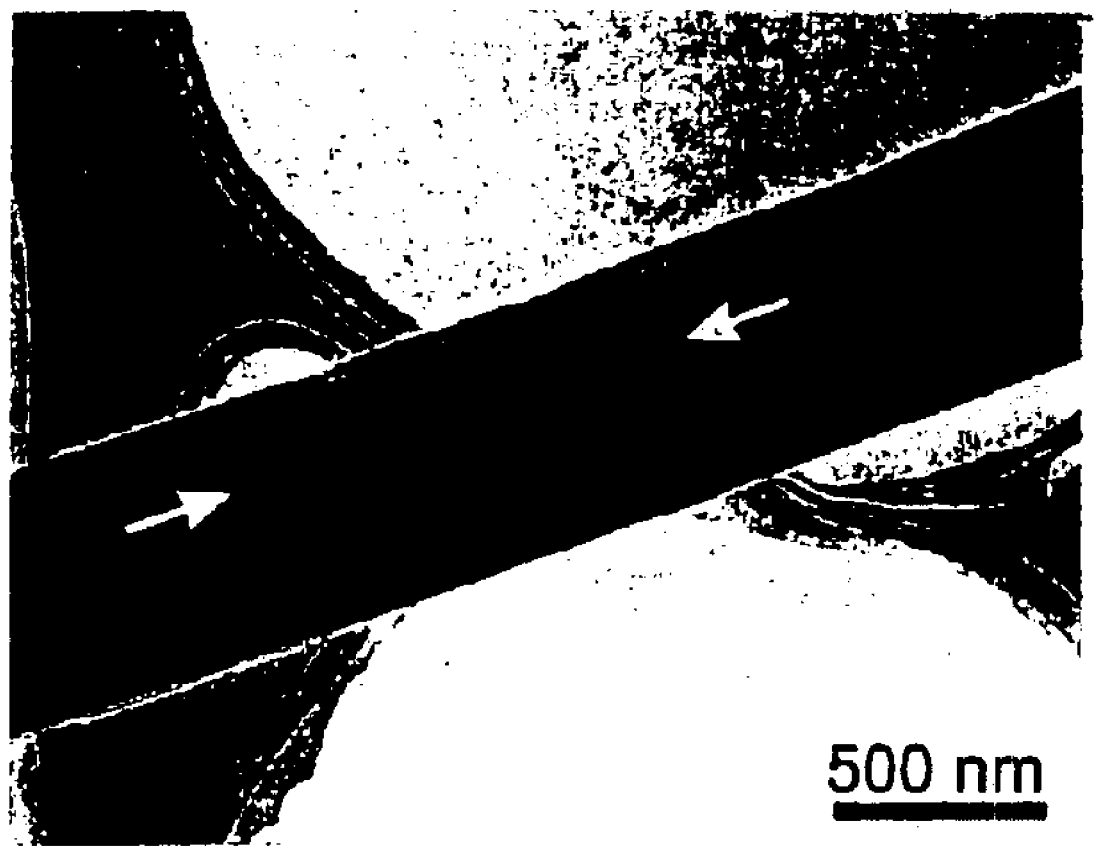
FIG. 24 is a transmission electron micrograph of the $C_{70}$ nanowhisker.

The transmission electron micrograph of FIG. 24 shows that the $C_{70}$ nanowhisker consists of multilayered laminae. This is also supported by the broken extinction fringe at the position indicated by the two arrows.

Figure 25:
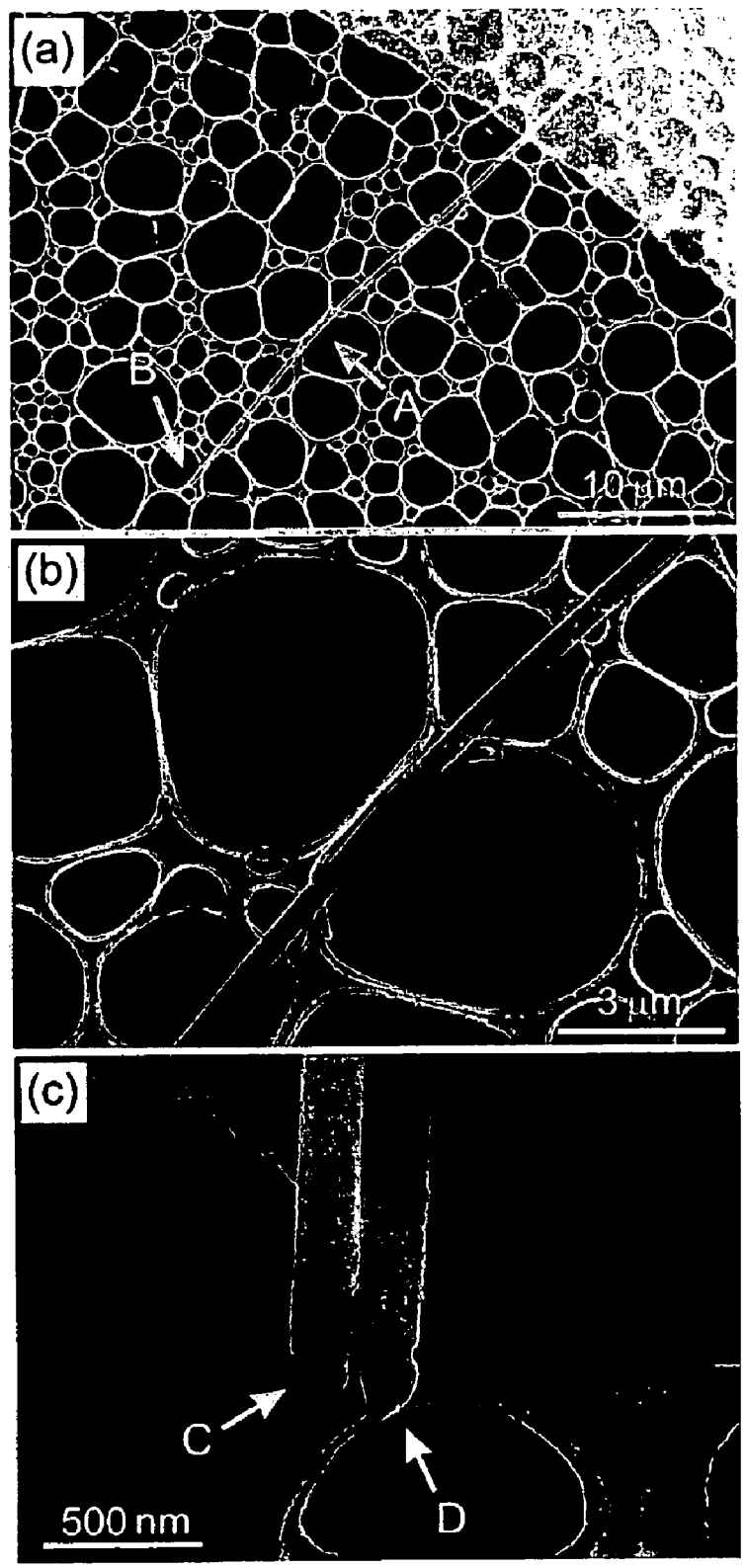
FIGS. 25A, 25B and 25C are each a scanning electron micrograph, an enlarged view of the area indicated by the arrow A, and an enlarged view of the area indicated by the arrow B, respectively, of the $C_{70}$ nanowhisker, wherein C and D are structures which are supposed to be seed crystals.

The scanning electron micrograph of the $C_{70}$ nanowhiskers in FIG. 25C shows that the $C_{70}$ nanowhiskers grows from structures indicated by C and D that are supposed to be seed crystals. These structures supposed to be seed crystals may be $C_{70}$ crystals deposited from the liquid-liquid interface during production. Regarding the needle-like $C_{60}$ crystals, it is also speculated that nucleus as seed crystals of $C_{60}$ are formed at the liquid-liquid interface, and needle-like $C_{60}$ crystals grow around the nucleus.

Example 6

In this example, the structures of needle-like and wire-like $C_{60}$ crystals formed in a PZT-$C_{60}$ sol were investigated. In the preparation of a lead zirconate titanate (PZT) thin film according to a sol-gel process, it is known that a perovskite phase grows at low temperatures of 400° C. by the use of a PZT sol combined with a $C_{60}$ toluene solution. After further investigations on such a $C_{60}$-added PZT sol, the present inventors have found that needle-like and wire-like $C_{60}$ crystals are formed as precipitates or deposits during this preparation procedure. In this example, the structures of these crystals were examined.

A total of 2 mL of a saturated $C_{60}$ solution in toluene was added to 3 mL of an isopropyl alcohol solution (0.4 M PZT sol) containing lead acetate trihydrate, titanium tetraisopropoxide and zirconium tetra-n-propoxide, followed by stirring by ultrasonic application or the like.

The resulting brown precipitate was fixed to a TEM micro-grid and was observed by SEM and TEM (200 kV and 1250 kV, respectively).

Figure 26:
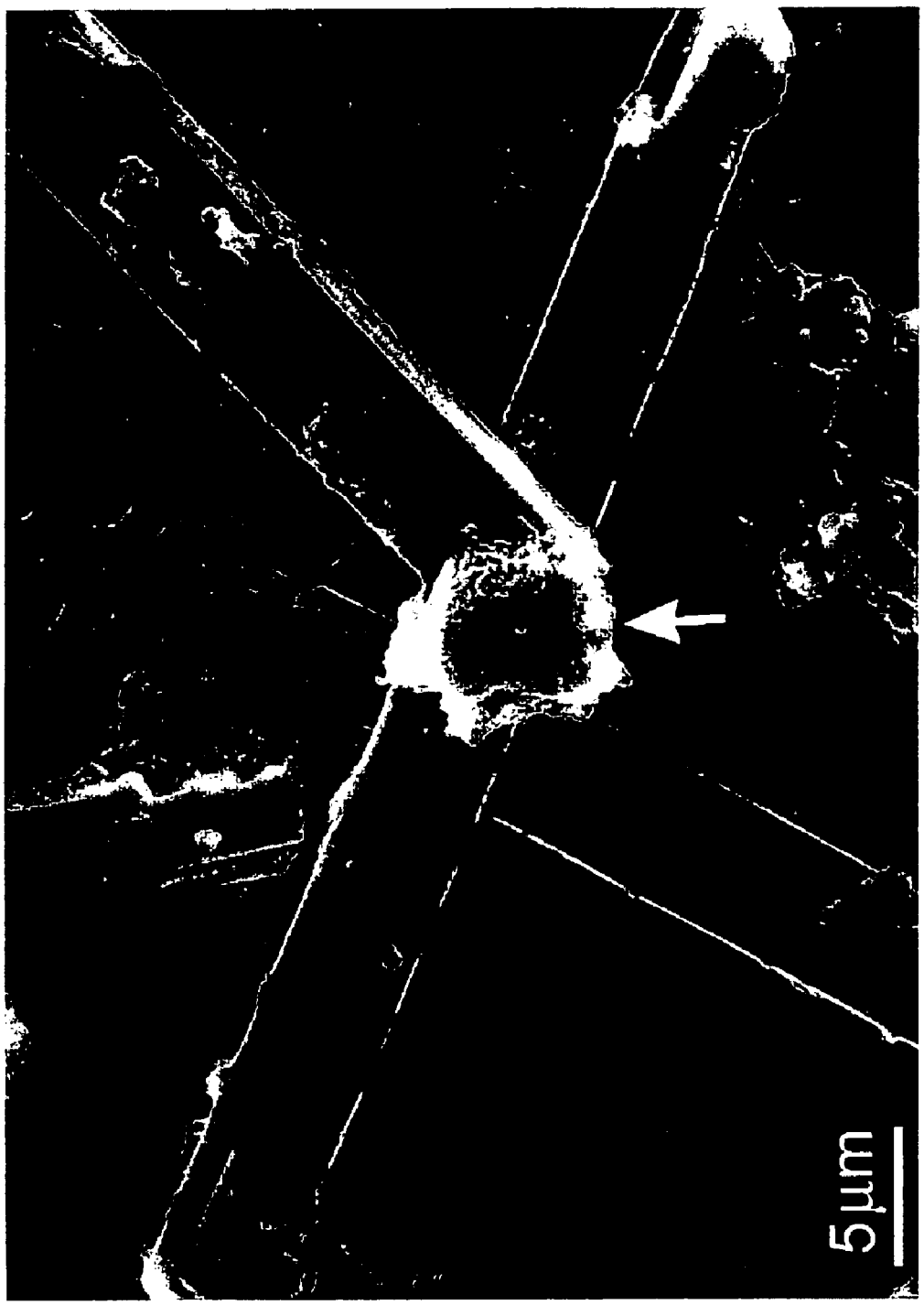
FIG. 26 is a scanning electron micrograph of needle-like $C_{60}$ crystals, wherein the arrow indicates a lead zirconate titanate (PZT) gel.
Figure 27:
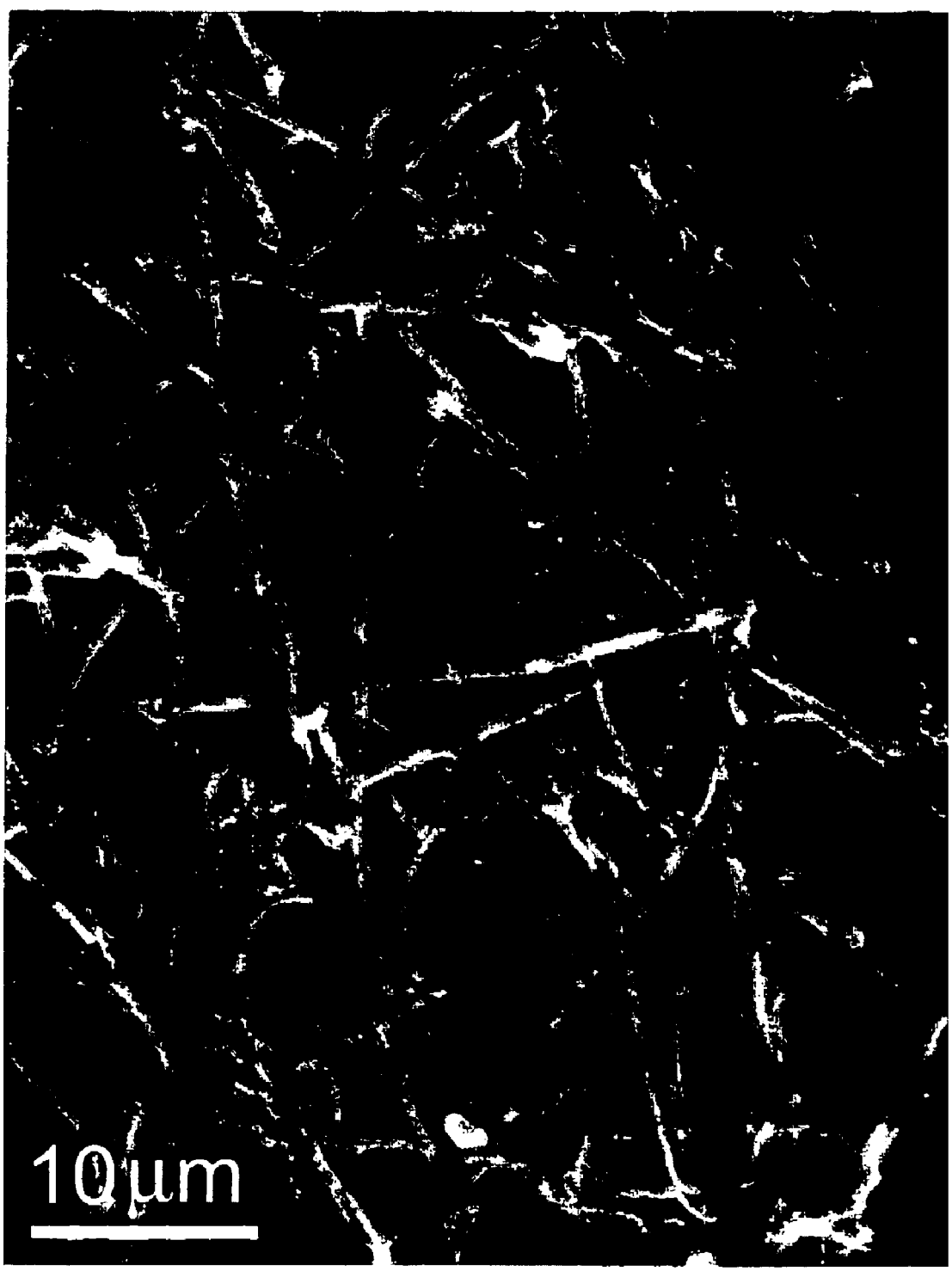
FIG. 27 is a scanning electron micrograph of wire-like $C_{60}$ crystals.

As a result, needle-like $C_{60}$ crystals each having clear crystal habit plane (FIG. 26) and wire-like $C_{60}$ crystals (FIG. 27) were observed. The TEM observation shows that all the wire-like $C_{60}$ crystals were single $C_{60}$ crystals ($C_{60}$ nanowhiskers) having a growth axis in the <110> axis, without exception. The HRTEM analysis (1250 kV) indicates that $C_{60}$ was polymerized. FIG. 26 shows that the PZT gel indicated by the arrow was attached to the $C_{60}$ crystal.

Example 7

The effect of a metal wire in the liquid-liquid deposition process was determined. Ultrasonic blending of a sol of lead zirconate titanate (PZT) and a $C_{60}$ toluene solution yielded nanowhiskers and needle-like crystals of $C_{60}$.

The structures and other configurations of the nanowhiskers and needle-like crystals of $C_{60}$ formed at the interface between the saturated $C_{60}$ toluene solution and isopropyl alcohol (IP) were determined in this example.

Specifically, 3 mL of a saturated $C_{60}$ toluene solution was placed in a 9-mL vial; next 3 mL of isopropyl alcohol was carefully placed therein to thereby form a liquid-liquid interface between the saturated $C_{60}$ toluene solution and isopropyl alcohol. The vial was then allowed to stand to grow needle-like $C_{60}$ crystals. In this procedure, a copper fine wire was placed in the vial to accelerate the nucleation.

Consequently, $C_{60}$ crystals deposited in the vicinity of a point of intersection of the copper wire and the liquid-liquid interface. The $C_{60}$ crystals included needle-like crystals having a diameter on the order of micrometers and a length of about 10 mm and needle-like crystals having a submicron diameter and a length of 100 μm or more.

The latter needle-like $C_{60}$ crystals were found to be single crystals ($C_{60}$ nanowhiskers) based on TEM observation. All the $C_{60}$ nanowhiskers had a growth axis in the <110> axis, i.e., the closest packing direction of $C_{60}$ crystals, without exception.

Example 8

In this example, hollow needle-like fullerene crystals were examined. The liquid-liquid deposition process is a complicated process in which super-saturation is brought at an interface between two liquids to thereby deposit crystals. The deposition of the crystals according to this process depends on various factors such as the concentration of a solute, temperature and the volume ratio of the resulting solution. A variety of agravic experiments and simulations have been made on protein synthesis according to the liquid-liquid deposition process.

In this example, a liquid-liquid interface was formed using a saturated $C_{60}$ toluene solution and isopropyl alcohol (IP) to thereby deposit two types of crystals, hollow needle-like $C_{60}$ crystals and brown wire-like $C_{60}$ crystals ($C_{60}$ whiskers).

The fundamental characteristics of the resulting needle-like $C_{60}$ crystals were determined herein.

Specifically, 30 mL of a saturated $C_{60}$ toluene solution was placed in a 100-mL beaker; next, 30 mL of isopropyl alcohol (IP) was carefully placed thereon in such a manner that the two liquids were not mixed with each other to thereby form a liquid-liquid interface. The beaker was allowed to stand at room temperature, and the resulting needle-like $C_{60}$ crystals were analyzed by SEM, powder X-ray diffractometry (powder XRD), thermogravimetry (TG), differential thermal analysis (DTA; rate of temperature rise: 10° C./min., in the air) and Fourier transform infrared spectrometry (FT-IR).

Figure 28:
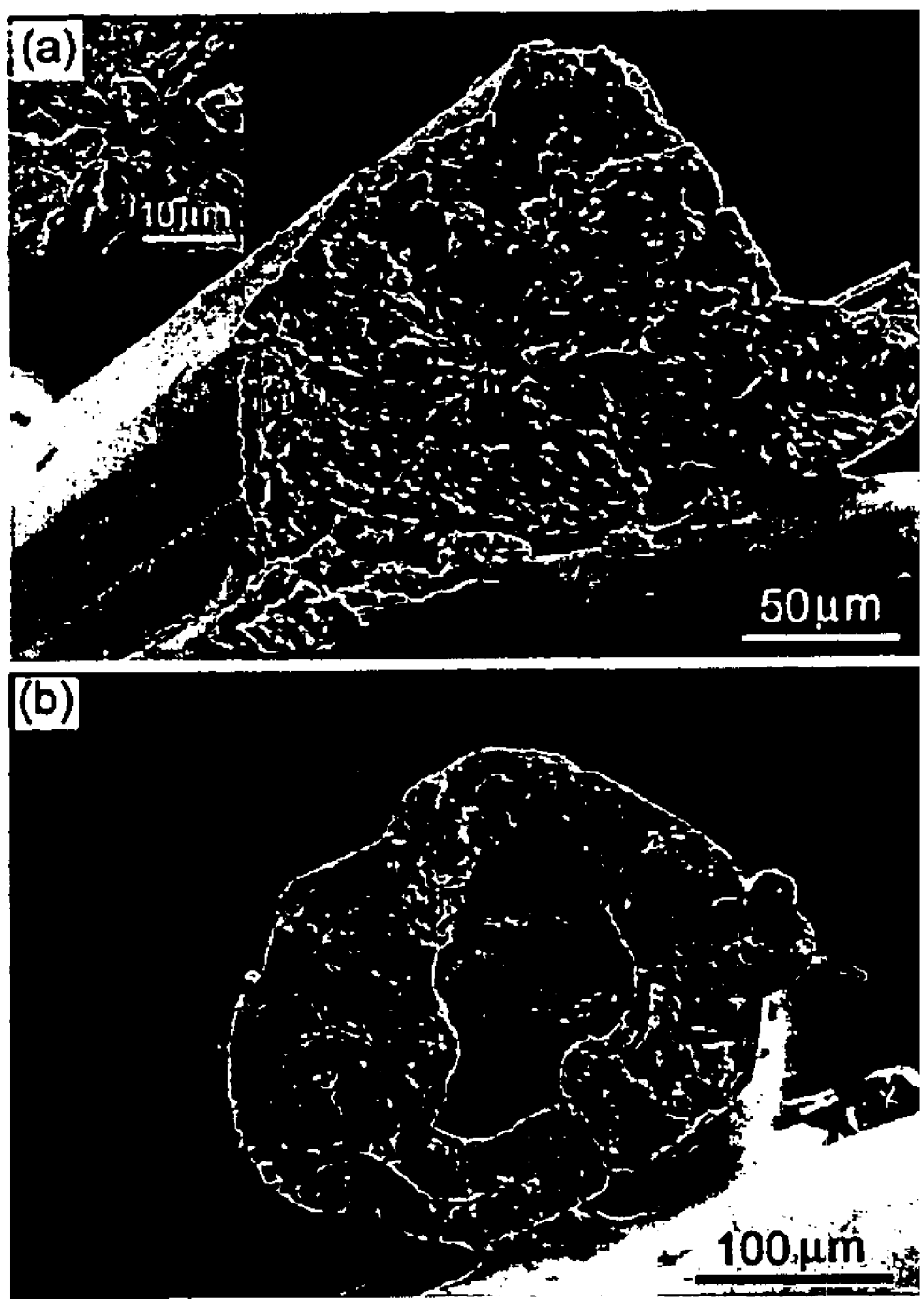
FIGS. 28A and 28B are scanning electron micrographs showing cross sections of a needle-like $C_{60}$ crystal having a relatively small cavity, and that having a relatively large cavity inside, respectively.

The needle-like $C_{60}$ crystals were found to grow at high speed at the liquid-liquid interface between the saturated $C_{60}$ toluene solution and isopropyl alcohol. As shown in FIGS. 28A and 28B, the needle-like $C_{60}$ crystals each have a diameter of from several tens of micrometers to several hundreds of micrometers and a length of from several millimeters to 1 cm, have a clear habit plane and have a hollow structure.

The powder X-ray diffraction pattern shows that the crystals are $C_{60}$ cubic crystals. However, precise determination of lattice constants shows that these crystals have a lattice constant a of 1.4255±0.0033 nm, which is slightly larger than the lattice constant a of 1.4175±0.0014 nm of the original $C_{60}$, indicating the former crystals expanded slightly.

Figure 29:
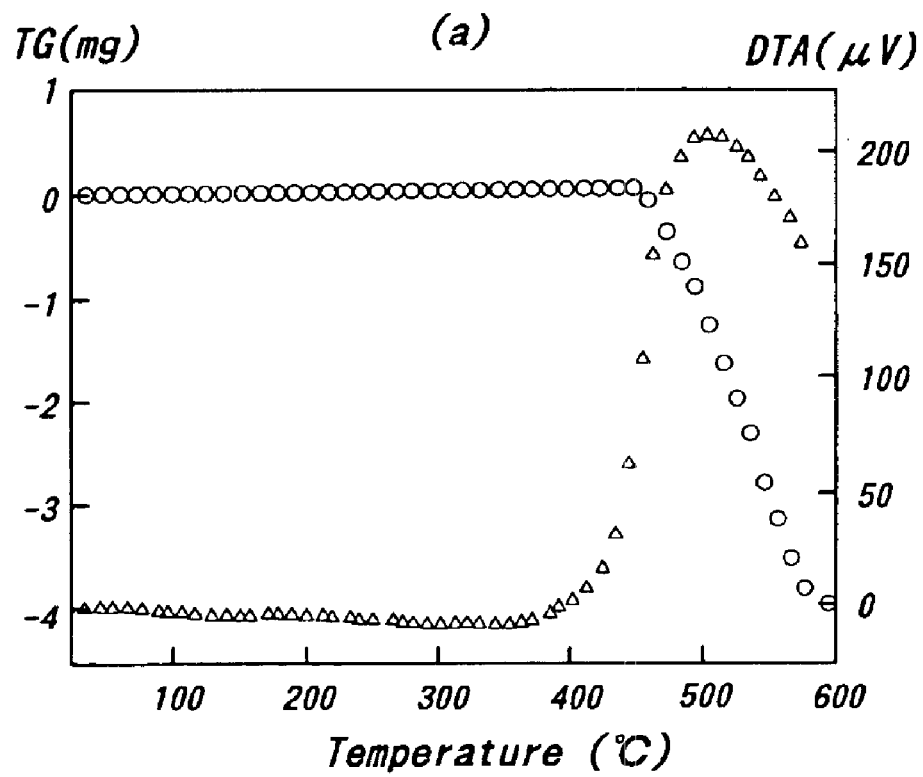
FIGS. 29A and 29B are graphs showing the results of thermogravimetric analysis (TG) and differential thermal analysis (DTA) of a material $C_{60}$ and a needle-like $C_{60}$ crystal, respectively.
Figure 29:
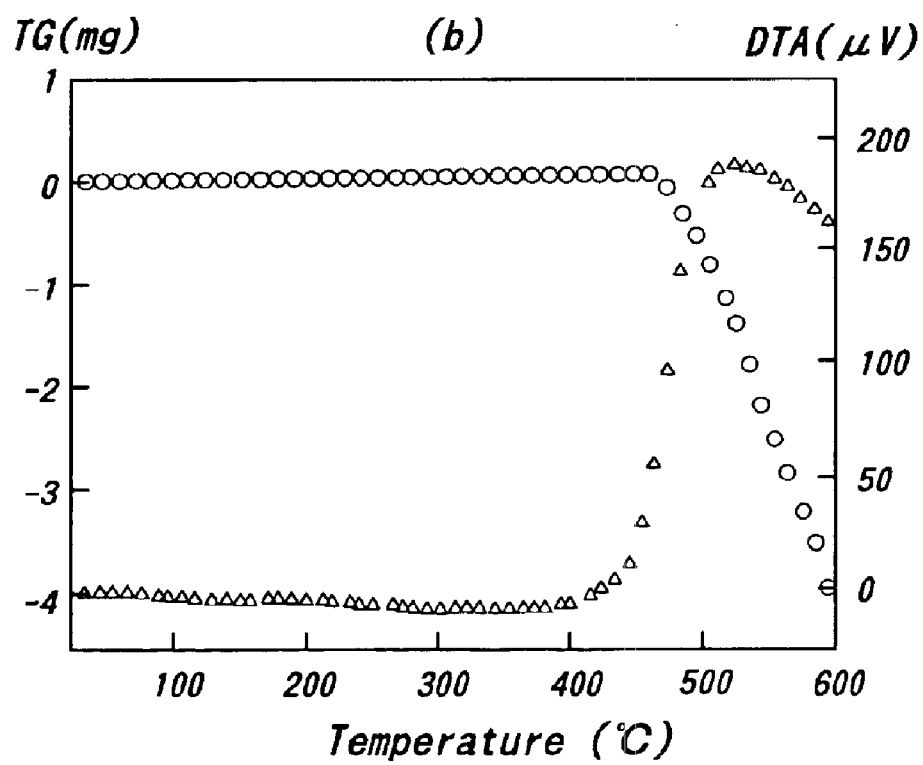

As shown in FIGS. 29A and 29B, the TG-DTA analysis shows that no endothermic peak due to evaporation of the solvents is observed. The kick-off temperature of $C_{60}$ varies from one sample to another, indicating that the crystals included different crystalline states.

The crystals are found to be insulative. The crystals are damaged by irradiation of electron beams upon TEM observation.

Example 9

In this example, hollow needle-like fullerene crystals are examined. Specifically, needle-like $C_{60}$ crystals grew at high speed at a liquid-liquid interface between a saturated $C_{60}$ toluene solution and isopropyl alcohol.

This is probably because supersaturation of $C_{60}$ was brought at the interface between the two liquids.

The resulting needle-like crystals included two types of crystals. One was a black hollow crystal having a diameter of from several tens of micrometers to several hundreds of micrometers and a length of several millimeters to 1 cm. The other was a brown single crystal having a diameter of several hundreds of nanometers and a length of several tens of micrometers or more.

The needle-like $C_{60}$ crystals each had a clear crystal habit plane, and some of them had a hexagonal cross section. The X-ray diffraction pattern of the hollow needle-like $C_{60}$ crystal shows that it was a cubic crystal of $C_{60}$.

A copper wire was then placed at the interface between the two liquids and was thereby plated with deposited $C_{60}$ crystals. The resulting material will be applied as a fiber-reinforced composite material or a nano-material having various hopeful physical properties such as field emission or superconduction.

Example 10

The structural characteristics of the needle-like $C_{60}$ crystals were determined by transmission electron microscopy (TEM), X-ray diffractometry (XRD) and Fourier transform infrared spectrometry (FT-IR). Specifically, a solution of 3 wt % of powdered $C_{60}$ (99.5%, available from MER Corp., Tucson, Ariz.) in toluene was prepared, was placed into a glass bottle (9 mL); next, isopropyl alcohol was carefully placed thereon to thereby form a liquid-liquid interface. An upper layer was isopropyl alcohol and a lower layer was the $C_{60}$ toluene solution.

The bottle was lidded and was covered with aluminum foil, was allowed to stand still at room temperature (RT; about 21° C.) to thereby deposit needle-like crystals of grown $C_{60}$. Separately, needle-like $C_{60}$ crystals were prepared in large quantity using a 100-mL beaker.

The structures of the above obtained samples were analyzed by FT-IR, XRD, TEM and HRTEM (using JEM-1250 available from JEOL, Japan; 1250 kV). The samples were subjected to pretreatment according to a conventional procedure, and where necessary, an internal standard was used in analysis.

Figure 30:
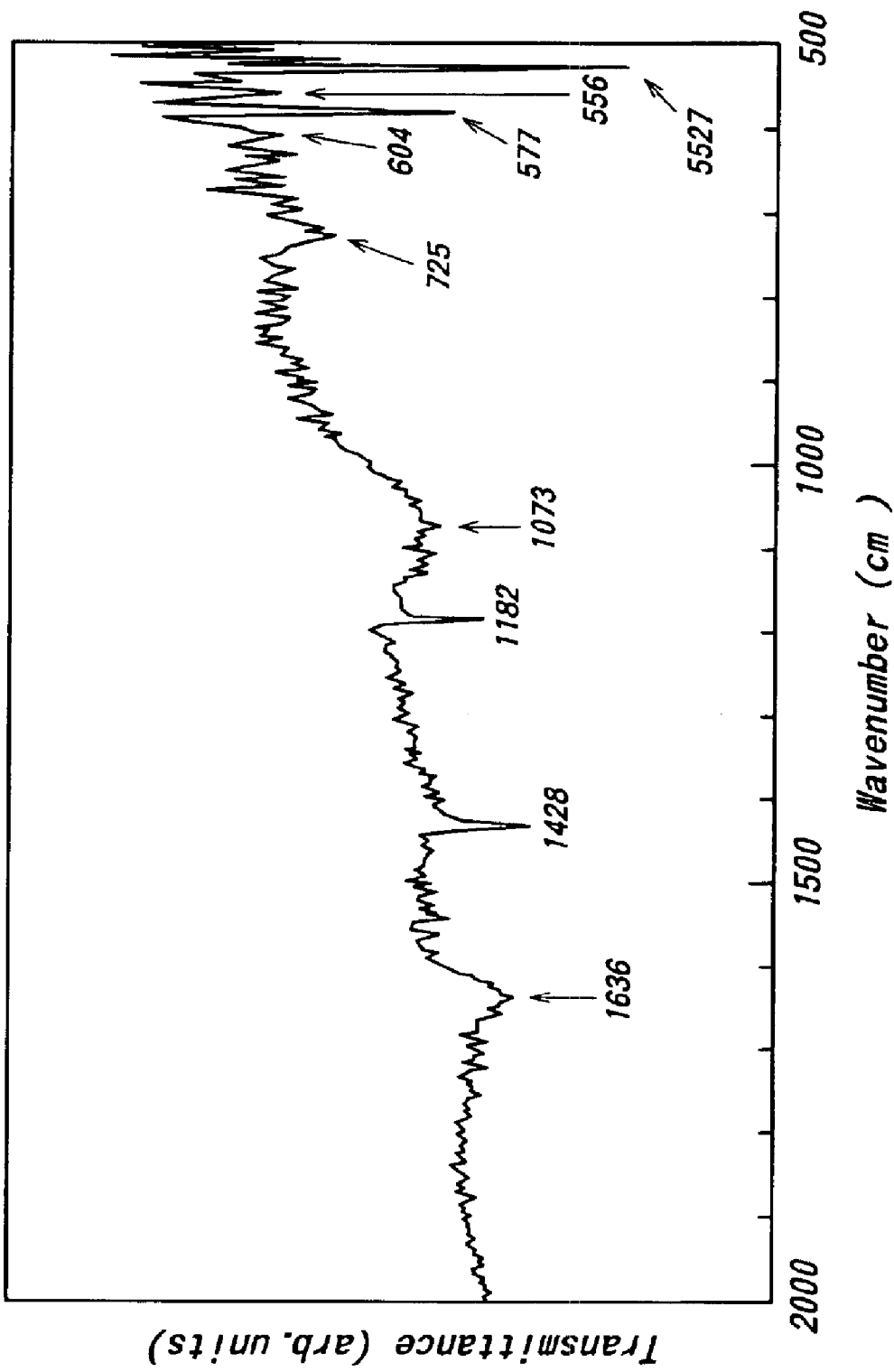
FIG. 30 is Fourier transform infrared spectroscopic (FT-IR) spectrum of a needle-like $C_{60}$ crystal.

As shown in FIG. 30, the FT-IR pattern of the needle-like crystal shows an absorption peak of the original $C_{60}$, indicating that the needle-like crystal consists of $C_{60}$ molecules. No absorption peak derived from toluene and isopropyl alcohol is observed.

FIG. 30 also shows new peaks at 556, 604, 725, 1073 and 1636 $cm^{-1}$. These peaks are similar to a polymer of $C_{60}$ consisting of about 50% of an orthorhombic phase and about 50% of a tetragonal phase, indicating that chemical bonds were formed between the $C_{60}$ molecules.

Figure 31:
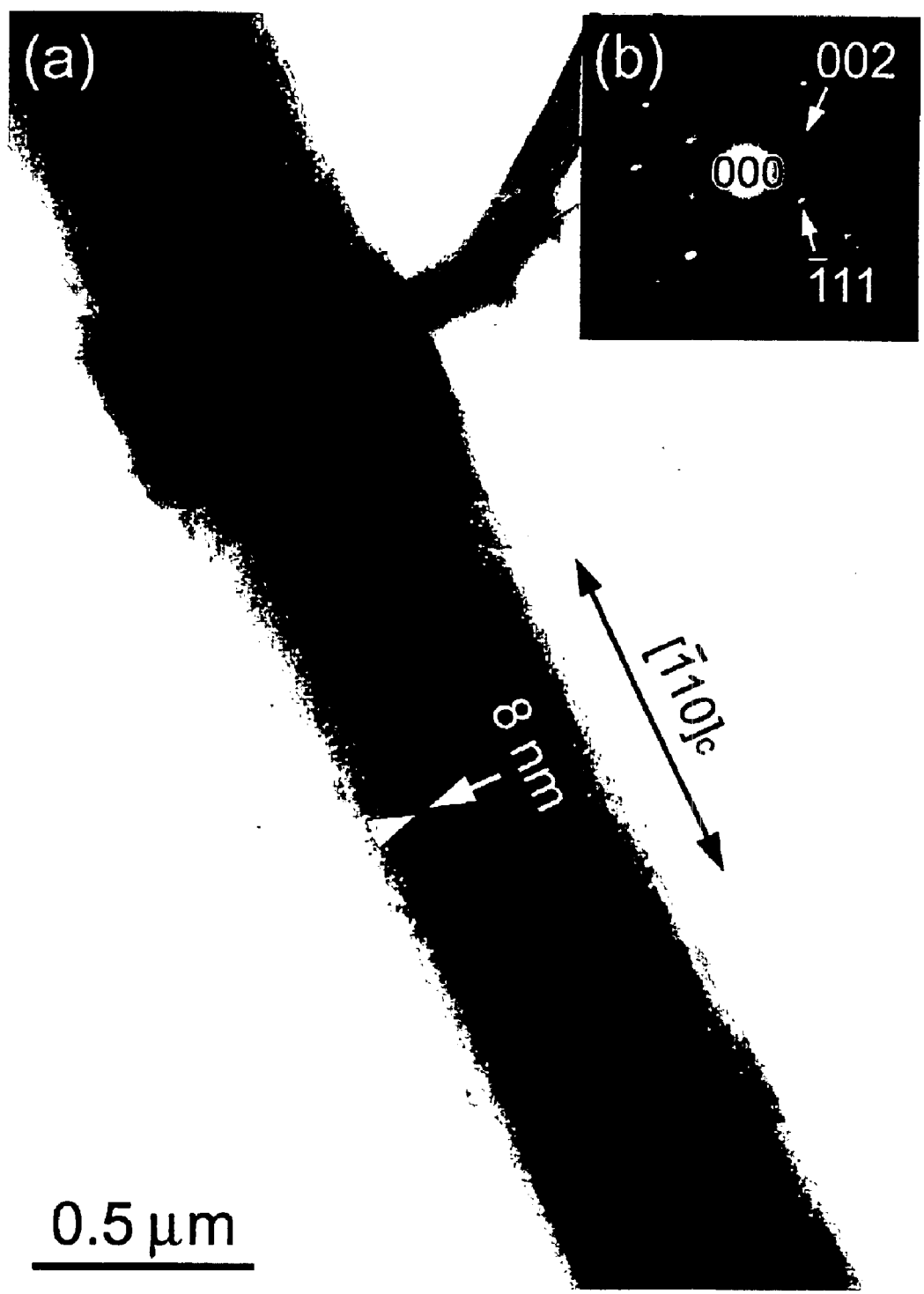
FIGS. 31A and 31B are each a bright-field pattern and a selected-area electron diffraction pattern in scanning electron microscopy (200 kV) of the $C_{60}$ nanowhisker.

The TEM images in FIGS. 31A and 31B show that the needle-like crystal includes thin slabs about 8 nm thick arrayed in parallel with the growth axis.

Figure 32:
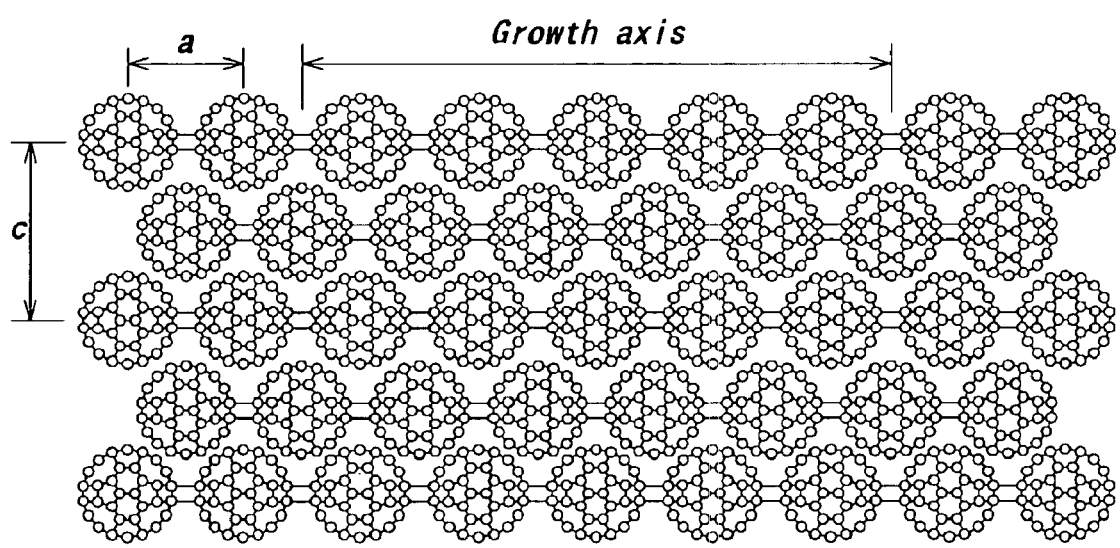
FIG. 32 is a diagram showing a body-centered tetragonal crystal model of a $C_{60}$ nanowhiskers polymerized by "2+2" cycloaddition of $C_{60}$ molecules.

The $C_{60}$ nanowhiskers are supposed to be formed by "2+2" cycloaddition, as schematically illustrated in FIG. 32, based on the analysis of the less internal cluster distance (intermolecular distance) of the $C_{60}$ molecules and the $<100>_t$ growth axis of the $C_{60}$ nanowhiskers.

The $C_{60}$ nanowhiskers may be prepared by polymerization according to the following mechanism. Specifically, the $C_{60}$ molecules are confined within very small spaces at the interface between toluene and isopropyl alcohol to thereby bring supersaturation of $C_{60}$ molecules and undergo a very high pressure. The pressure reaches on the order of gigapascals to thereby allow the $C_{60}$ molecules to two-dimensionally polymerize by "2+2" cycloaddition.

Table 2 shows the interplanar spacing of the $C_{60}$ nanowhisker determined by fast Fourier transform (FFT) image of a high-resolution transmission electron micrograph, that of a pure $C_{60}$ crystal determined by X-ray diffractometry, and that of a needle-like $C_{60}$ crystal determined by X-ray diffractometry.

The results show that the interplanar spacing of the $(220)_c$ plane of the $C_{60}$ nanowhisker is less than that of the pure $C_{60}$ crystal, indicating that the distance between the $C_{60}$ molecules in the $C_{60}$ nanowhisker is reduced as compared with that of the pure $C_{60}$ crystal.

In contrast, the interplanar spacing of the $(220)_c$ plane of the needle-like $C_{60}$ crystal having a diameter larger than the $C_{60}$ nanowhisker is the same as that of the pure $C_{60}$ crystal. These results suggest that the distance between $C_{60}$ molecules decreases with a decreasing diameter of a needle-like $C_{60}$ crystal, and the $C_{60}$ molecules are combined with each other by action of a strong force in the growth axis direction.

TABLE 2

Interplanar Spacing $d_{hkl}$ (nm) of $C_{60}$ Crystals

| Miller Indices | $d_{hkl}$ of needle-like $C_{60}$ crystal determined by FFT image of HRTEM | $d_{hkl}$ of pure $C_{60}$ crystal determined by X-ray diffractometry | $d_{hkl}$ of needle-like $C_{60}$ crystal determined by X-ray diffractometry |
|---|---|---|---|
| (111)c, (101)t | 0.809 ± 0.013 | 0.8175 | 0.8175 ± 0.0030 |
| (002)c, (002)t | 0.738 ± 0.031 | | |
| (220)c, (200)t | 0.481 ± 0.003 | 0.5006 | 0.5006 ± 0.0018 | c: cubic crystal
t: tetragonal crystal

Other embodiments and variations will be obvious to those skilled in the art, and this invention is not to be limited to the specific matters stated above.

What is claimed is:

1. A fine carbon wire comprising a needle crystal of a fullerene having a smooth surface with an external diameter of 1 nm or more, a length of 1 μm or more and an aspect ratio of 2 or more, wherein the needle crystal comprises a multilayer lamina of the fullerene and has a structure wherein the fullerene molecules are linearly polymerized.

2. The fine carbon wire according to claim 1, wherein the needle crystal includes a dopant.

3. A fine carbon wire comprising a branched needle crystal of a fullerene having an external diameter of 1 nm or more, a length of 1 μm or more and an aspect ratio of 2 or more, wherein the needle crystal comprises a multilayer lamina of the fullerene and has a structure wherein the fullerene molecules are linearly polymerized.

4. The fine carbon wire according to claim 1 or 3, wherein the needle crystal is a needle single crystal.

5. The fine carbon wire according to claim 1 or 3, wherein said needle crystal has a shape having an external diameter of 3 nm or more, a length of 50 μm or more and an aspect ratio of 2 or more.

6. The fine carbon wire according to claim 1 or 3, wherein the needle crystal has a structure polymerized by "2+2+ cycloaddition of fullerene molecules and comprises a body-centered tetragonal crystal of fullerene.

7. The fine carbon wire according to claim 1 or 3, wherein the needle crystal has a solid structure.

8. A method for producing a fine carbon wire comprising a fullerene set forth in claim 1, the method comprising the steps of:
   (1) putting together a solution containing the fullerene dissolved in a first solvent with a second solvent having less solvency for the fullerene than the first solvent;
   (2) forming a liquid-liquid interface between the solution and the second solvent; and
   (3) depositing a fine carbon wire at the liquid-liquid interface.

9. A method for producing a fine carbon wire comprising a fullerene set forth in claim 3, the method comprising the steps of:
   (1) putting together a solution containing the fullerene dissolved in a first solvent with a second solvent having less solvency for the fullerene than the first solvent; and
   (2) subjecting the solution and the second solvent to ultrasonic treatment to thereby deposit a fine carbon wire.

10. The method according to claim 8 or 9, wherein the first solvent is a good solvent for the fullerene and the second solvent is a poor solvent for the fullerene.

11. The method according to claim 8 or 9, wherein the first solvent is a nonpolar solvent and the second solvent is a polar solvent.

12. The method according to claim 8 or 9, wherein the first solvent is a hydrocarbon solvent.

13. The method according to claim 12, wherein the hydrocarbon solvent comprises at least one selected from the group consisting of toluene, xylene, benzene, hexane, pentane, and derivatives thereof.

14. The method according to claim 8 or 9, wherein the second solvent is an alcohol solvent.

15. The method according to claim 14, wherein the alcohol solvent comprises at least one selected from the group consisting of pentanol, butyl alcohol, isopropyl alcohol, n-propyl alcohol, methyl alcohol, ethyl alcohol and polyhydric alcohols.

16. The method according to claim 8 or 9, wherein a metal catalyst or a metallic oxide catalyst is added in the step (1).

17. The method according to claim 8 or 9, wherein the solution containing the fullerene dissolved in a first solvent further comprises an additive.

18. The method according to claim 8 or 9, wherein second solvent further comprises an auxiliaries.

19. The method according to claim 8 or 9, wherein the fine carbon wire grows from a nucleus of the fullerene.

20. The method according to claim 19, wherein the nucleus of the fullerene is added to the solution containing the fullerene.

21. The method according to claim 19, wherein a metal is placed in the solution containing the fullerene.

22. The method according to claim 21, wherein the metal comprises at least one selected from the group consisting of copper, aluminum gold and stainless steel.

23. The method according to claim 21, wherein the metal is in a form of one selected from the group consisting of a wire, a plate and a mesh.

24. The method according to claim 8 or 9, wherein the growth rate of the fine carbon wire is from 10 to 400 mm/h.

* * * * *